(12) United States Patent
Kim et al.

(10) Patent No.: US 8,802,315 B2
(45) Date of Patent: Aug. 12, 2014

(54) COMPOSITION, COMPOSITE PREPARED FROM THE COMPOSITION, ELECTRODE USING THE COMPOSITION OR THE COMPOSITE, COMPOSITE MEMBRANE INCLUDING THE COMPOSITE, AND FUEL CELL INCLUDING THE COMPOSITE MEMBRANE

(71) Applicant: Samsung Electronics Co., Ltd., Suwon-si (KR)

(72) Inventors: Ki-hyun Kim, Yongin-si (KR); Pil-won Heo, Yongin-si (KR); Chan-ho Pak, Yongin-si (KR); Seong-woo Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/675,633

(22) Filed: Nov. 13, 2012

(65) Prior Publication Data
US 2013/0122395 A1    May 16, 2013

(30) Foreign Application Priority Data
Nov. 16, 2011    (KR) .......................... 10-2011-0119771

(51) Int. Cl.
*H01M 4/90*    (2006.01)
*H01M 8/10*    (2006.01)

(52) U.S. Cl.
USPC ........................... 429/482; 429/492; 252/500

(58) Field of Classification Search
None
See application file for complete search history.

(56) References Cited

U.S. PATENT DOCUMENTS

| | | |
|---|---|---|
| 5,525,436 A | 6/1996 | Savinell et al. |
| 6,229,054 B1 | 5/2001 | Dai et al. |
| 2004/0028976 A1 | 2/2004 | Cabasso et al. |
| 2005/0080183 A1 | 4/2005 | Chung et al. |
| 2007/0141426 A1* | 6/2007 | Choi et al. ...................... 429/33 |
| 2007/0292620 A1 | 12/2007 | Volle et al. |
| 2009/0117440 A1 | 5/2009 | Choi et al. |

(Continued)

FOREIGN PATENT DOCUMENTS

| | | |
|---|---|---|
| DE | 10239701 A1 | 3/2004 |
| JP | 2006-131731 A | 5/2006 |

(Continued)

OTHER PUBLICATIONS

Fuchs et al. Supramolecular Fuel Cell Membranes. University of Nevada. 2008.*

(Continued)

*Primary Examiner* — Patrick Ryan
*Assistant Examiner* — Christopher Domone
(74) *Attorney, Agent, or Firm* — Cantor Colburn LLP

(57) ABSTRACT

A composition including a cross-linkable compound and at least one selected from compounds represented by Formula 1, a composite obtained from the composition, an electrode including the composition or the composite, a composite membrane including the composite, and a fuel cell including the composite membrane, Formula 1

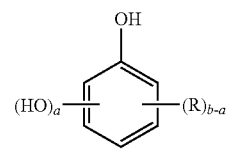

wherein, in Formula 1, a and R are as defined in the specification.

28 Claims, 8 Drawing Sheets

(56) References Cited

U.S. PATENT DOCUMENTS

| 2010/0181697 | A1 | 7/2010 | Uensal et al. |
| 2010/0273087 | A1 | 10/2010 | Choi et al. |
| 2011/0003234 | A1 | 1/2011 | Martin et al. |

FOREIGN PATENT DOCUMENTS

| JP | 2009-013374 A | 1/2009 |
| KR | 1020080058814 A | 6/2008 |
| KR | 1020090042080 A | 4/2009 |
| WO | 2011/132152 A1 | 10/2011 |

OTHER PUBLICATIONS

Abstract of JPH0368121. Sugiura et al. Mar. 25, 1991.*
STN Search Report. pp. 9-10, 18. Nov. 1, 2013.*
The extended European search report for European patent application No. 12192634.9 dated Jan. 30, 2014.
Database WPI—Week 200712, Thomson Scientific, London, GB AN 2007-115890 & JP 2006 351401 A (Toyota Jidosha KK) Dec. 28, 2006.
Database WPI, Week 200376, Thomson Scientific, London GB, AN 2003-807700 & JP 2003 183526 A (JSR Corp) Jul. 3, 2003.

* cited by examiner

COMPOSITION, COMPOSITE PREPARED FROM THE COMPOSITION, ELECTRODE USING THE COMPOSITION OR THE COMPOSITE, COMPOSITE MEMBRANE INCLUDING THE COMPOSITE, AND FUEL CELL INCLUDING THE COMPOSITE MEMBRANE

CROSS-REFERENCE TO RELATED APPLICATIONS

This application claims the benefit of Korean Patent Application No. 10-2011-0119771 filed on Nov. 16, 2011, and all the benefits accruing therefrom under 35 U.S.C. §119, the contents of which is incorporated herein in its entirety by reference.

BACKGROUND

1. Field

The present disclosure relates to a composition, a composite prepared from the composition, an electrode using the composition or the composite, a composite membrane including the composite, and a fuel cell including the composite membrane.

2. Description of the Related Art

According to types of an electrolyte and fuel used, fuel cells can be classified as polymer electrolyte membrane fuel cells ("PEMFCs"), direct methanol fuel cells ("DMFCs"), phosphoric acid fuel cells ("PAFCs"), molten carbonate fuel cells ("MCFCs"), or solid oxide fuel cells ("SOFCs").

PEMFCs operate at temperatures of 100° C. or higher and, in contrast to the fuel cells which operate at low temperatures, PEMFCs do not need a humidifier. PEMFCs are also known to be convenient in terms of control of water supply and are highly reliable in terms of system operation at high temperature. Furthermore, PEMFCs may become more durable against carbon monoxide (CO) poisoning that may occur with fuel electrodes as they operate at high temperatures, and thus, a simplified reformer may be used therefor. These advantages make PEMFCs increasingly popular for use at high-temperature and in non-humidifying conditions.

As there are current trends for increasing the operation temperature of PEMFCs as described above, fuel cells operable at high temperatures are drawing more attention.

However, electrolyte membranes of fuel cells that have been developed so far do not exhibit satisfactory mechanical strength and durability at high temperatures. Accordingly, there remains a demand in their further improvement.

SUMMARY

Provided are a composition, a composite prepared from the composition, an electrode using the composition or the composite, a composite membrane using the composite, a method of preparing the composite membrane, and a high-performance fuel cell including the composition, the composite, or the composite membrane.

Additional aspects will be set forth in part in the description which follows and, in part, will be apparent from the description, or may be learned by practice of the presented embodiments.

According to an aspect of the present disclosure, there is provided a composition including at least one of compounds represented by Formula 1 below and a cross-linkable compound:

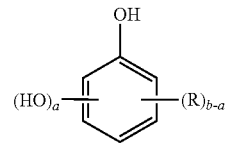

Formula 1 wherein, in Formula 1, a is 0, 1, or 2; b is 0, 1, 2, 3, or 4, provided that a+b is 1, 2, 3, 4, or 5; and each R is independently a substituted or unsubstituted $C_1$-$C_{40}$ alkyl group, a substituted or unsubstituted $C_1$-$C_{40}$ alkoxy group, a substituted or unsubstituted $C_2$-$C_{40}$ alkenyl group, a substituted or unsubstituted $C_2$-$C_{40}$ alkynyl group, a substituted or unsubstituted $C_6$-$C_{40}$ aryl group, a substituted or unsubstituted $C_6$-$C_{40}$ aryloxy group, a substituted or unsubstituted $C_2$-$C_{40}$ heteroaryl group, a substituted or unsubstituted $C_2$-$C_{40}$ heteroaryloxy group, a substituted or unsubstituted $C_4$-$C_{40}$ carbocyclic group, a substituted or unsubstituted $C_4$-$C_{40}$ carbocyclic oxy group, a substituted or unsubstituted $C_2$-$C_{40}$ heterocyclic group, a halogen atom, a hydroxyl group, or a cyano group.

According to another aspect of the present disclosure, there is provided a composite that is a polymerization product of the composition described above.

According to another aspect of the present disclosure, there is provided a composite membrane including the composite.

According to another aspect of the present disclosure, there is provided an electrode for a fuel cell, the electrode including the composition or a composite that is a polymerization product of the composition.

According to another aspect of the present disclosure, there is provided a fuel cell including: a cathode; an anode; and an electrolyte membrane disposed between the cathode and the anode, wherein the electrolyte membrane is the above-described composite membrane.

According to another aspect of the present disclosure, there is provided a fuel cell including: a cathode; an anode; and an electrolyte membrane disposed between the cathode and the anode, wherein at least one of the cathode and the anode includes the above-described composition, or a composite that is a polymerization product of the composition.

According to another aspect of the present disclosure, there is provided a method of manufacturing a composite membrane, the method including: mixing at least one of compounds represented by Formula 1 and a cross-linkable compound to obtain a composition; and coating and thermally treating the composition to obtain the composite membrane comprising a composite that is a polymerization product of the composition including the at least one of compounds represented by Formula 1 and the cross-linkable compound:

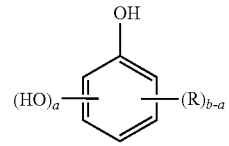

Formula 1 wherein, in Formula 1, a is 0, 1, or 2; b is 0, 1, 2, 3, or 4, provided that a+b is 1, 2, 3, 4, or 5; and each R is independently a hydrogen atom, a substituted or unsubstituted $C_1$-$C_{40}$ alkyl group, a substituted or unsubstituted $C_1$-$C_{40}$ alkoxy group, a substituted or unsubstituted $C_2$-$C_{40}$ alkenyl group, a substituted or unsubstituted $C_2$-$C_{40}$ alkynyl group, a substituted or unsubstituted $C_6$-$C_{40}$ aryl group, a substituted or unsubstituted $C_6$-$C_{40}$ aryloxy group, a substituted or unsubstituted $C_2$-$C_{40}$ heteroaryl group, a substituted or unsubstituted $C_2$-$C_{40}$ heteroaryloxy group, a substituted or unsubstituted $C_4$-$C_{40}$ carbocyclic group, a substituted or unsubstituted $C_4$-$C_{40}$ carbocyclic oxy group, a substituted or unsubstituted $C_2$-$C_{40}$ heterocyclic group, a halogen atom, a hydroxyl group, or a cyano group.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
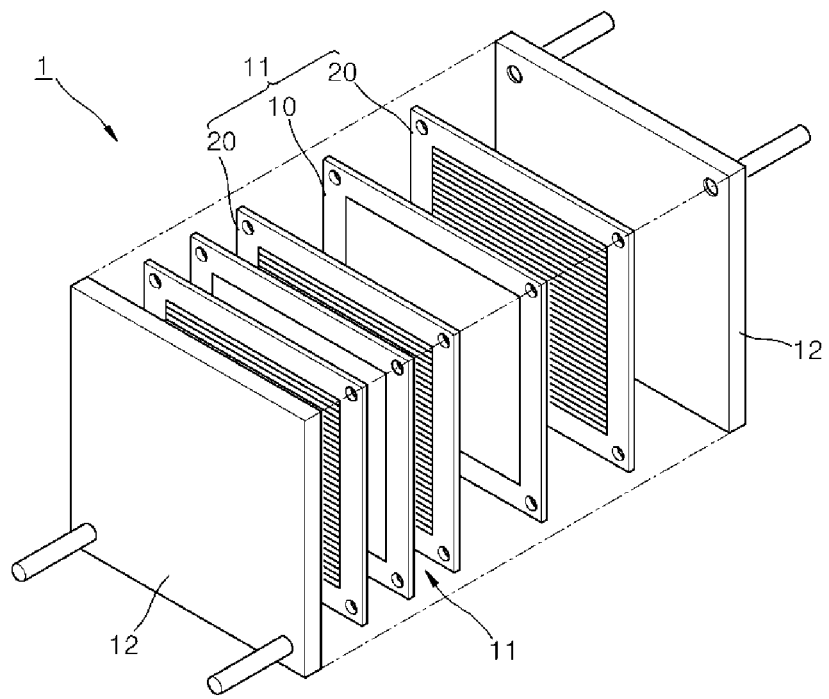
FIG. 1 is a perspective exploded view of a fuel cell according to an embodiment of the present disclosure.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. These embodiments are provided so that this disclosure will be thorough and complete, and will fully convey the scope of the claims to those skilled in the art.

It will be understood that when an element is referred to as being "on" another element, it can be directly on the other element or intervening elements may be present therebetween. In contrast, when an element is referred to as being "directly on" another element, there are no intervening elements present. As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present embodiments.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

According to an aspect of the present disclosure, there is provided a composition including at least one of compounds represented by Formula 1 below, and a cross-linkable compound.

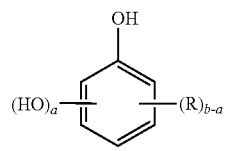

Formula 1

In Formula 1, a is 0, 1, or 2; b is 0, 1, 2, 3, or 4, provided that a+b is 0, 1, 2, 3, or 5; and each R is independently a substituted or unsubstituted $C_1$-$C_{40}$ alkyl group, a substituted or unsubstituted $C_1$-$C_{40}$ alkoxy group, a substituted or unsubstituted $C_2$-$C_{40}$ alkenyl group, a substituted or unsubstituted $C_2$-$C_{40}$ alkynyl group, a substituted or unsubstituted $C_6$-$C_{40}$ aryl group, a substituted or unsubstituted $C_6$-$C_{40}$ aryloxy group, a substituted or unsubstituted $C_2$-$C_{40}$ heteroaryl group, a substituted or unsubstituted $C_2$-$C_{40}$ heteroaryloxy group, a substituted or unsubstituted $C_4$-$C_{40}$ carbocyclic group, a substituted or unsubstituted $C_4$-$C_{40}$ carbocyclic oxy group, a substituted or unsubstituted $C_2$-$C_{40}$ heterocyclic group, a halogen atom, a hydroxyl group, or a cyano group.

If a in Formula 1 above is 0, $(HO)_a$ is absent, and any open valence(s) on the carbon atoms of the ring is/are filled by substituent R or a hydrogen atom. Similarly, if b in Formula 1 is 0, the R substituents are absent, and any open valence(s) is/are filled by (HO) or hydrogen, and where a+b is less than or equal to 4, the open carbon atom valence(s) of the ring is/are filled by a hydrogen atom.

If a in Formula 1 above is 0, 1, or 2, there may be four, three, or two substituents R, respectively, which may be identical to or different from each other.

For example, the compounds of Formula 1 may exclude a compound with no substituents R.

The at least one of compounds represented by Formula 1 may include at least one of compounds represented by Formula 2 below or at least one of compounds represented by Formula 3 below:

Formula 2

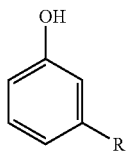

wherein, in Formula 2 above, R is a substituted or unsubstituted $C_{10}$-$C_{30}$ alkyl group, a substituted or unsubstituted $C_{10}$-$C_{30}$ alkenyl group, or a substituted or unsubstituted $C_{10}$-$C_{30}$ alkynyl group.

Formula 3

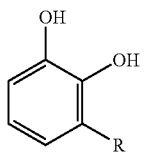

wherein, in Formula 3 above, R is a substituted or unsubstituted $C_{10}$-$C_{30}$ alkyl group, a substituted or unsubstituted $C_{10}$-$C_{30}$ alkenyl group, or a substituted or unsubstituted $C_{10}$-$C_{30}$ alkynyl group.

The at least one of compounds represented by Formula 1 may include at least one of a compound represented by Formula 2A below, a compound represented by Formula 2B below, a compound represented by Formula 2C, and a compound represented by Formula 2D below:

Formula 2A

Formula 2B

Formula 2C

Formula 2D

The at least one of compounds represented by Formula 1 may include at least one of a compound represented by Formula 3A, a compound represented by Formula 3B, a compound represented by Formula 3C, a compound represented by Formula 3D, or a compound represented by Formula 3E:

Formula 3A

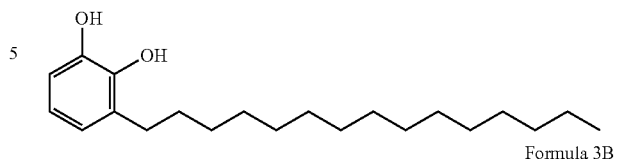

Formula 3B

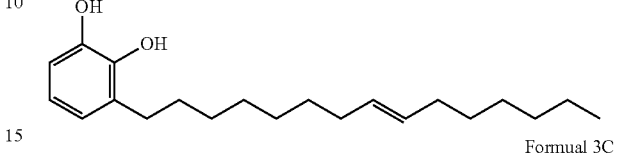

Formual 3C

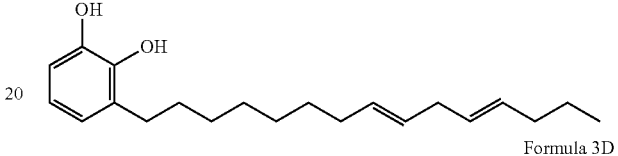

Formula 3D

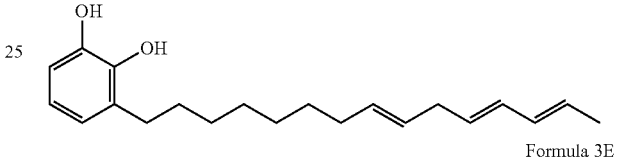

Formula 3E

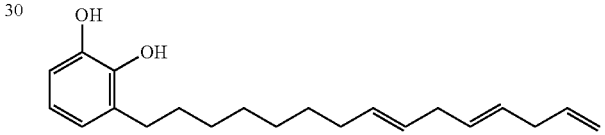

A composition including at least one of the compound represented by Formula 2A above, the compound represented by Formula 2B above, the compound represented by Formula 2C above, the compound represented by Formula 2D above, and the compound represented by Formula 2E above may be represented by Formula 2E below: As represented in Formula 2E below, the composition containing a combination of compounds of Formula 2 may include about 1-5 weight percent ("wt %") of the compound of Formula 2A, about 30-35 wt % of the compound of Formula 2B, about 20-25 wt % of the compound of Formula 2C, and about 40-45 wt % of the compound of Formula 2D.

Formula 2E

In Formula 2E above, $R_1$ is as follows:

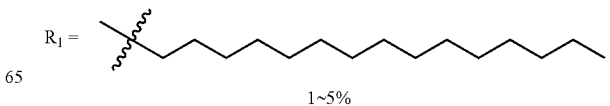

1~5%

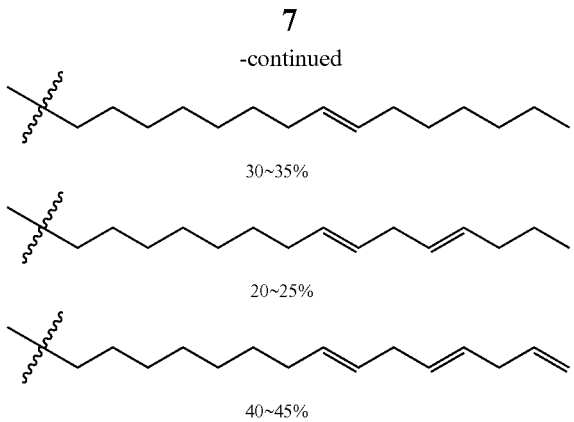

30~35%

20~25%

40~45%

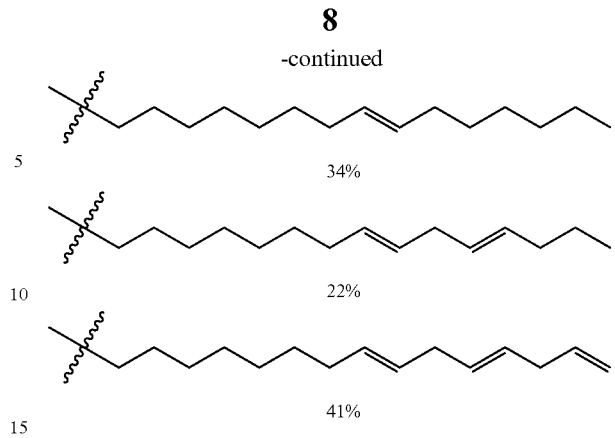

34%

22%

41%

In Formula 2E, "%" in the representation of $R_1$ above indicates percent by weight ("wt %").

The composition of Formula 2E may be a mixture of four phenol derivatives with different saturated or unsaturated alkyl groups at meta positions. These mixtures may be extracted from plants. Such plants are being grown in a wide range of areas covering the subtropical zones and tropical zones, which may ensure sustainable supply of the mixed compounds at low costs.

For example, the at least one of the compound represented by Formula 3A above, the compound represented by Formula 3B above, the compound represented by Formula 3C above, the compound represented by Formula 3D and the compound represented by Formula 3E above may be a mixture of the compound represented by Formula 3A above, the compound represented by Formula 3B above, the compound represented by Formula 3C above, the compound represented by Formula 3D, and the compound represented by Formula 3E above.

The compound of Formula 3A, the compound of Formula 3B, the compound of Formula 3C, the compound of Formula 3D and the compound represented by Formula 3E may be used in the amounts generally used in the art.

A mixture of the compound of Formula 3A, the compound of Formula 3B, the compound of Formula 3C, and the compound of Formula 3D may, for example, be urushiol.

The at least one of compounds represented by Formula 1 may be, for example, a composition including a mixture of compounds represented by Formula 2F below. Specifically, the mixture of compounds represented by Formula 2F may be a mixture of about 3 wt % of the compound of Formula 2A, about 34 wt % of the compound of Formula 2B, about 22 wt % of the compound of Formula 2C, and about 40-45 wt % of the compound of Formula 2D.

Formula 2F

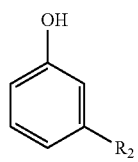

In Formula 2F, $R_2$ is as follows:

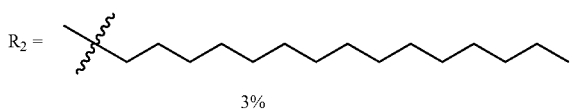

3%

In Formula 2F, "%" in the representation of $R_2$ above indicates percent by weight (wt %).

The composition of Formula 2F may be a mixture of phenol derivatives with four different saturated or unsaturated alkyl groups at meta positions.

The at least one of compounds of Formula 1 may include a saturated or unsaturated hydrocarbon group in a side chain. Such compounds may be polymerizable with a cross-linkable compound, and self-cross-linkable, and thus may form a composite and a composite membrane each having improved physical properties.

In addition to the cross-linkable compound, at least one of compounds represented by Formulae 4-9 below, which may be involved in the polymerization reaction, may further be included.

An amount of the at least one of compounds of Formula 1 in the composition may be from about 5 parts to about 60 parts by weight based on 100 parts by weight of the cross-linkable compound, and in some embodiments, may be from about 10 parts to about 40 parts by weight based on 100 parts by weight of the cross-linkable compound.

When the amount of the compounds of Formula 1 is within these ranges, a composite prepared from the composition and a composite membrane formed using the composite may have improved physical properties.

The cross-linkable compound may be any compound with a functional group that is cross-linkable with the compounds of Formula 1 above.

Examples of the cross-linkable compound are any nitrogen-containing aromatic compound, including five-membered cyclic, nitrogen-containing aromatic compounds, and six-membered cyclic, nitrogen-containing aromatic compounds, such as polypyridine.

The cross-linkable compound may be at least one of an azole-based polymer, polyoxazole, polyimide, polysulfone, polyether sulfone, and polyketone.

When an azole-based polymer is used as the cross-linkable compound, a final product may be a product of polymerization of the compounds of Formula 1 and the azole-based polymer.

In addition to the cross-linkable compound, the composition may further include at least one of compounds represented by Formulae 4 to 9 below. When the composition further includes the at least one of compounds of Formulae 4-9 below, the at least one of compounds of Formulae 4-9 may form a graft copolymer from polymerization with the cross-linkable compound and the compounds of Formula 1 above.

As used herein, the term "a polymerization product of the compound represented by Formula 1 and the cross-linkable compound" may be construed as including one of the graft copolymer described above.

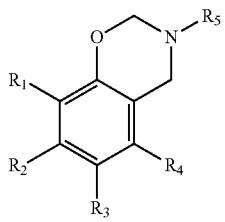

Formula 4

In Formula 4, $R_1$, $R_2$, $R_3$ and $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, a halogen atom, a hydroxy group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group.

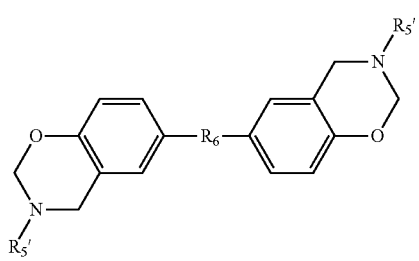

Formula 5

In Formula 5, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and $R_6$ is a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, or —SO$_2$—.

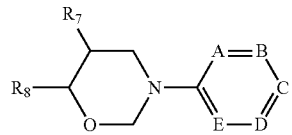

Formula 6

In Formula 6,

A, B, C, D and E are all carbon; or one or two of A, B, C, D and E is nitrogen and the others are carbon, and $R_7$ and $R_8$ are linked to form a ring, wherein the ring is a $C_6$-$C_{10}$ cycloalkyl group, a $C_3$-$C_{10}$ heteroaryl group, a fused $C_3$-$C_{10}$ heteroaryl group, a $C_3$-$C_{10}$ heterocyclic group, or a fused $C_3$-$C_{10}$ heterocyclic group.

Formula 7

In Formula 7,

A' is a substituted or unsubstituted $C_1$-$C_{20}$ heterocyclic group, a substituted or unsubstituted $C_4$-$C_{20}$ cycloalkyl group, or a substituted or unsubstituted $C_1$-$C_{20}$ alkyl group; and $R_9$ to $R_{16}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_2$-$C_{20}$ heteroaryl group, a $C_2$-$C_{20}$ heteroaryloxy group, a $C_4$-$C_{20}$ cycloalkyl group, a $C_1$-$C_{20}$ heterocyclic group, a halogen atom, a cyano group, or a hydroxy group.

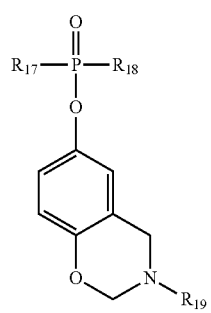

Formula 8

In Formula 8, $R_{17}$ and $R_{18}$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group, or a group represented by Formula 8A below:

Formula 8A

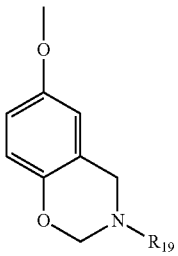

wherein, in Formulae 8 and 8A, $R_{19}$ and $R_{19'}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_2$-$C_{20}$ heteroaryl group, a $C_2$-$C_{20}$ heteroaryloxy group, a halogenated $C_2$-$C_{20}$ heteroaryl group, a halogenated $C_2$-$C_{20}$ heteroaryloxy group, a $C_4$-$C_{20}$ cycloalkyl group, a halogenated $C_4$-$C_{20}$ cycloalkyl group, a $C_1$-$C_{20}$ heterocyclic group, or a halogenated $C_1$-$C_{20}$ heterocyclic group.

Formula 9

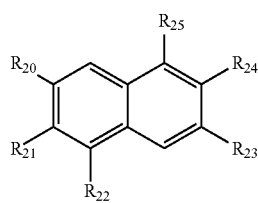

In Formula 9, two adjacent groups selected from $R_{20}$, $R_{21}$, and $R_{22}$ are linked to form a group represented by Formula 9A below;

the unselected rest of $R_{20}$, $R_{21}$ and $R_{22}$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_2$-$C_{20}$ heteroaryl group, a $C_2$-$C_{20}$ heteroaryloxy group, a halogenated $C_2$-$C_{20}$ heteroaryl group, a halogenated $C_2$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group, or a halogenated $C_1$-$C_{20}$ heterocyclic group;

two adjacent groups selected from among $R_{23}$, $R_{24}$, and $R_{25}$ are linked to form a group represented by Formula 9A; and the unselected rest of $R_{23}$, $R_{24}$ and $R_{25}$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_2$-$C_{20}$ heteroaryl group, a $C_2$-$C_{20}$ heteroaryloxy group, a halogenated $C_2$-$C_{20}$ heteroaryl group, a halogenated $C_2$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group, or a halogenated $C_1$-$C_{20}$ heterocyclic group;

Formula 9A

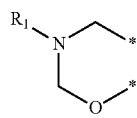

wherein in Formula 9 and 9A, $R_1'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and

* denotes the sites at which the two adjacent groups selected from $R_{20}$, $R_{21}$ and $R_{22}$ of Formula 9 are linked, and the two adjacent groups selected from among $R_{23}$, $R_{24}$ and $R_{25}$ of Formula 9 are linked.

An amount of the at least one compound of Formulae 4-9 in the composition may be from about 5 parts to about 70 parts by weight, and in some embodiments, may be from about 20 parts to about 50 parts by weight based on 100 parts by weight of the cross-linkable compound.

When the amount of the at least one compound of Formulae 4-9 is within these ranges, a composite prepared from the composition and a composite membrane formed using the composition may have improved physical properties.

According to another aspect of the present disclosure, provided is a composite membrane including a composite that is a polymerization product of the composition described above.

The composite membrane may have high mechanical strength and durability. The composite membrane may be used as an electrolyte membrane, for example, in a fuel cell.

The composite may be a polymerization product of the at least one of compounds of Formula 1 and a cross-linkable compound, or a polymerization product of the at least one of compounds of Formula 1, a cross-linkable compound, and the at least one of compounds of Formulae 4-9. When an electrolyte membrane is prepared using the composite, the electrolyte membrane may have improved physical properties, such as tensile strength and elongation, which, in turn, may improve processibility of the electrolyte membrane, suppress leakage of a phosphoric acid-based material from the electrolyte membrane, and improve conductivity of the electrolyte membrane. Thus, use of the electrolyte membrane may suppress leakage of phosphoric acid therefrom, and thus ensure manufacture of a fuel cell with improved cell performance, specifically, improved long-term durability and cell voltage.

The enhanced tensile strength and elongation of the electrolyte membrane are maintained after being doped with a phosphoric acid-based material.

It may be determined from infrared ("IR") absorption spectra or nuclear magnetic resonance ("NMR") spectra that the composite is a polymerization product of the at least one of compounds of Formula 1, a cross-linkable compound, and the at least one of compounds of Formulae 4-9.

Use of the electrolyte membrane having the composition described above may ensure manufacture of a fuel cell with improved durability and cell performance, due to interaction between the least one of compounds of Formula 1 and an azole-based polymer used as the cross-linkable compound, or between the at least one of compounds of Formula 1, the cross-linkable compound, and the at least one of compounds of Formulae 4-9.

The interaction may, for example, be a polymerization by oxidative coupling between the compound of Formula 1 as a phenolic derivative, an azole-based polymer as an aromatic compound, and/or the at least one of compounds of Formulae 4-9.

The composition may further include a phosphoric acid-based material.

Examples of the phosphoric acid-based material are polyphosphoric acid, phosphonic acid, phosphoric acid ($H_3PO_4$), pyro-phosphoric acid ($H_4P_2O_7$), triphosphoric acid ($H_5P_3O_{10}$), meta-phosphoric acid, and a derivative thereof. In an embodiment, the phosphoric acid-based material may be phosphoric acid.

The amount of the phosphoric acid-based material may be from about 1 part to about 500 parts by weight based on 100 parts by weight of the at least one of compounds of Formula 1. When the amount of the phosphoric acid-based material is within this range, a composite membrane manufactured from the composition may have high proton conductivity even with a small doping amount of the phosphoric acid-based material.

The azole-based polymer indicates a polymer, a repeating unit of which includes at least one aryl ring having at least one nitrogen atom.

The aryl ring may be a five-membered or six-membered ring with one to three nitrogen atoms that may be fused to another ring, for example, another aryl ring or heteroaryl ring. In this regard, the nitrogen atoms may be partially substituted with oxygen, phosphorous and/or sulfur atom. Non-limiting examples of the another aryl ring are phenyl, naphthyl, hexahydroindyl, indanyl, and tetrahydronaphthyl.

The azole-based polymer may have at least one amino group in the repeating unit as described above. In this regard, the at least one amino group may be a primary, secondary or tertiary amino group which is either a part of the aryl ring or a part of a substituent attached to the aryl ring.

The term "amino group" defines a group with a nitrogen atom covalently bonded to at least one carbon or hetero atom. The amino group may refer to, for example, —$NH_2$ and —$NH_2$ substituted moieties.

The term "amino group" also refers to an "alkylamino group" with nitrogen bound to at least one additional alkyl group, and "arylamino" and "diarylamino" groups with at least one or two nitrogen atoms bound to a selected aryl group.

Methods of preparing an azole-based polymer and a polymer film including the azole-based polymer are disclosed in US 2005/256296A.

Examples of the azole-based polymer are azole-based polymers including azole units represented by Formulae 10 to 23.

Formula 10

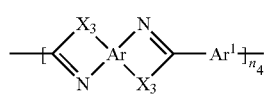

Formula 11

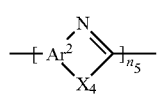

Formula 12

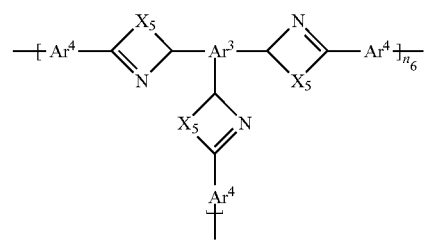

Formula 13

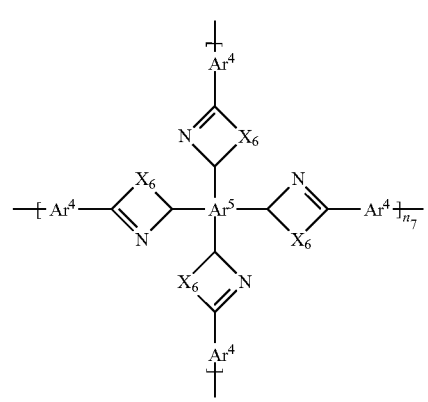

Formula 14

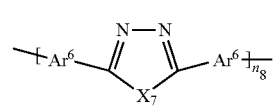

Formula 15

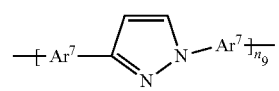

Formula 16

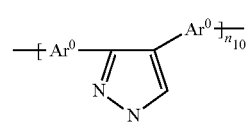

Formula 17

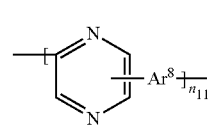

Formula 18

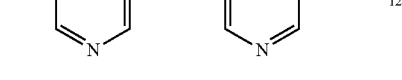

Formula 19

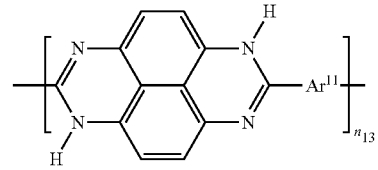

Formula 20

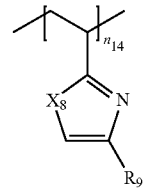

-continued

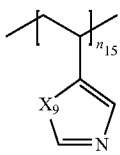

Formula 21

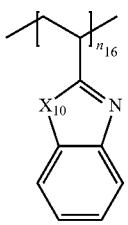

Formula 22

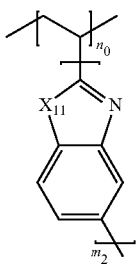

Formula 23

In Formulae 10 to 23, $Ar^0$ may be identical to or different from each other, and may be a monocyclic or polycyclic $C_6$-$C_{20}$ arylene group or a $C_2$-$C_{20}$ heteroarylene group;

Ar may be identical to or different from each other, and may be a monocyclic or polycyclic $C_6$-$C_{20}$ arylene group or a $C_2$-$C_{20}$ heteroarylene group;

$Ar^1$ may be identical to or different from each other, and may be a monocyclic or polycyclic $C_6$-$C_{20}$ arylene group or a $C_2$-$C_{20}$ heteroarylene group;

$Ar^2$ may be identical to or different from each other, and may be a monocyclic or polycyclic $C_6$-$C_{20}$ arylene group or a $C_2$-$C_{20}$ heteroarylene group;

$Ar^3$ may be identical to or different from each other, and may be a monocyclic or polycyclic $C_6$-$C_{20}$ arylene group or a $C_2$-$C_{20}$ heteroarylene group;

$Ar^4$ may be identical to or different from each other, and may be a monocyclic or polycyclic $C_6$-$C_{20}$ arylene group or a $C_2$-$C_{20}$ heteroarylene group;

$Ar^5$ may be identical to or different from each other, and may be a monocyclic or polycyclic $C_6$-$C_{20}$ arylene group or a $C_2$-$C_{20}$ heteroarylene group;

$Ar^6$ may be identical to or different from each other, and may be a monocyclic or polycyclic $C_6$-$C_{20}$ arylene group or a $C_2$-$C_{20}$ heteroarylene group;

$Ar^7$ may be identical to or different from each other, and may be a monocyclic or polycyclic $C_6$-$C_{20}$ arylene group or a $C_2$-$C_{20}$ heteroarylene group;

$Ar^8$ may be identical to or different from each other, and may be a monocyclic or polycyclic $C_6$-$C_{20}$ arylene group or a $C_2$-$C_{20}$ heteroarylene group;

$Ar^9$ may be identical to or different from each other, and may be a monocyclic or polycyclic $C_6$-$C_{20}$ arylene group or a $C_2$-$C_{20}$ heteroarylene group;

$Ar^{10}$ may be identical to or different from each other, and may be a monocyclic or polycyclic $C_6$-$C_{20}$ arylene group or a $C_2$-$C_{20}$ heteroarylene group;

$Ar^{11}$ may be identical to or different from each other, and may be a monocyclic or polycyclic $C_6$-$C_{20}$ arylene group or a $C_2$-$C_{20}$ heteroarylene group;

$X_3$ to $X_{11}$ may be identical to or different from each other, and may be an oxygen atom, a sulfur atom or —N(R')—; and R' may be a hydrogen atom, a $C_1$-$C_{20}$ alkyl group, a $C_1$-$C_{20}$ alkoxy group or a $C_6$-$C_{20}$ arylene group;

$R_9$ may be identical to or different from each other, and may be a hydrogen atom, a $C_1$-$C_{20}$ alkyl group or a $C_6$-$C_{20}$ aryl group; and $n_0$, $n_4$ to $n_{16}$, and $m_2$ may be each independently an integer of about 10 or greater, and in some embodiments, may be each independently an integer of about 100 or greater, and in some other embodiments, may be each independently an integer of about 100 to about 100,000.

Examples of the arylene or heteroarylene group are divalent groups derived from benzene, naphthalene, biphenyl, diphenylether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiazole, benzoxadiazole, benzopyridine, benzopyrazine, benzopyridazine, benzopyrimidine, benzotriazine, indolizine, quinolizine, pyridopyridine, imidazopyrimidine, pyrazinopyrimidine, carbazole, aziridine, phenazine, benzoquinoline, phenoxazine, phenothiazine, benzopteridine, phenanthroline and phenanthrene, wherein these aryl or heteroaryl groups may have one or more substituents.

$Ar^1$, $Ar^4$, $Ar^6$, $Ar^7$, $Ar^8$, $Ar^9$, $Ar^{10}$, and $Ar^{11}$ defined above may have any substitution pattern. For example, if $Ar^1$, $Ar^4$, $Ar^6$, $Ar^7$, $Ar^8$, $Ar^9$, $Ar^{10}$, and $Ar^{11}$ are phenylene, $Ar^1$, $Ar^4$, $Ar^6$, $Ar^7$, $Ar^8$, $Ar^9$, $Ar^{10}$ and $Ar^{11}$ may be ortho-phenylene, meta-phenylene or para-phenylene.

The alkyl group may be a $C_1$-$C_4$ short-chain alkyl group, such as methyl, ethyl, n-propyl, i-propyl or t-butyl. The aryl group may, for example, be a phenyl group or a naphthyl group.

Examples of the substituent include a halogen atom, such as fluorine, an amino group, a hydroxyl group, and a short-chain alkyl group, such as methyl or ethyl.

Examples of the azole-based polymer include polyimidazole, polybenzothiazole, polybenzoxazole, polyoxadiazole, polyquinoxaline, polythiadiazole, polypyridine, polypyrimidine, and polytetrazapyrene.

The azole-based polymer may be a copolymer or blend including at least two units selected from among units represented by Formulae 10 to 23 above. The azole-based polymer may be a block copolymer (for example, di-block or tri-block copolymer), a random copolymer, a periodic copolymer or an alternating copolymer including at least two units selected from the units of Formulae 10 to 23.

In some embodiments, the azole-based polymer may include only at least one of the units represented by Formulae 10 and 11.

Examples of the azole-based polymer are polymers represented by Formulae 24 to 50 below:
Formula 24
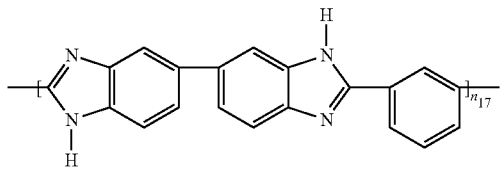
Formula 25
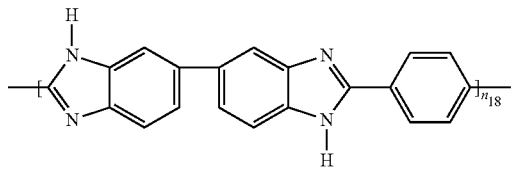
Formula 26
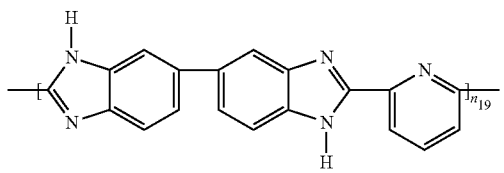
Formula 27
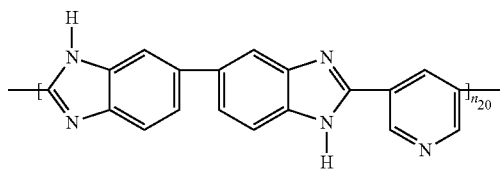
Formula 28
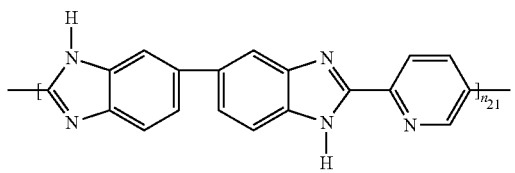
Formula 29
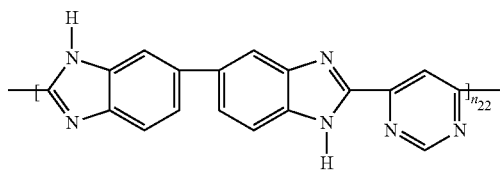
Formula 30
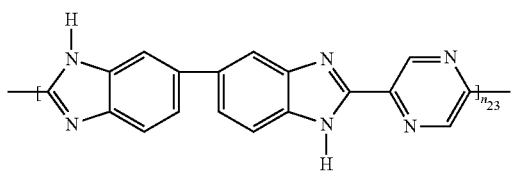
Formula 31
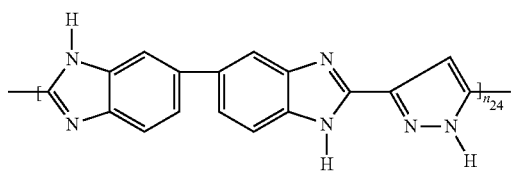
Formula 32
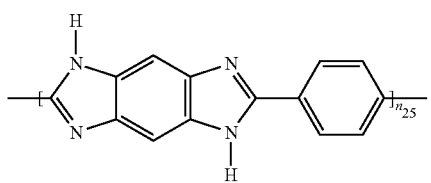
Formula 33
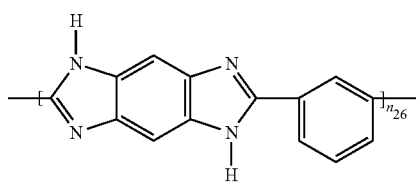
Formula 34
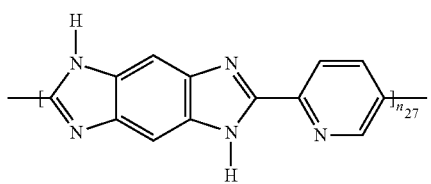
Formula 35
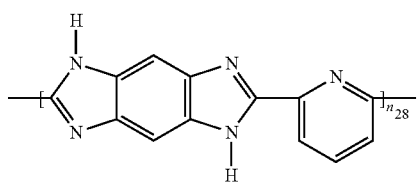
Formula 36
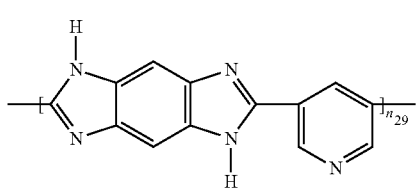
Formula 37
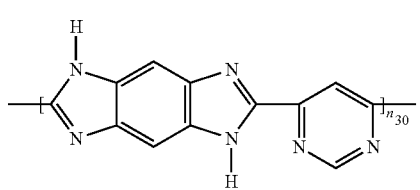

-continued
Formula 38
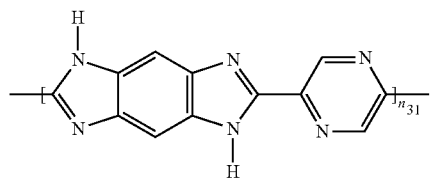
Formula 39
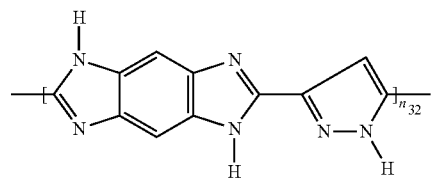
Formula 40
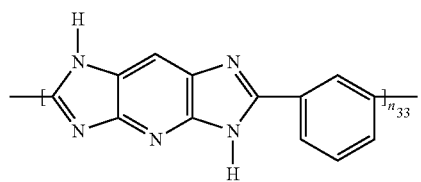
Formula 41
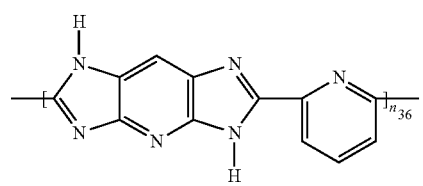
Formula 42
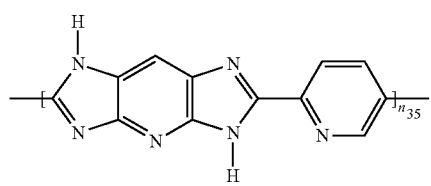
Formula 43
Formula 44
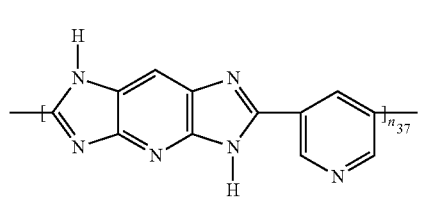
Formula 45
Formula 46
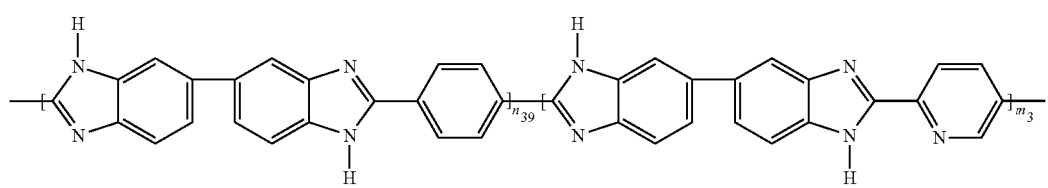
Formula 47
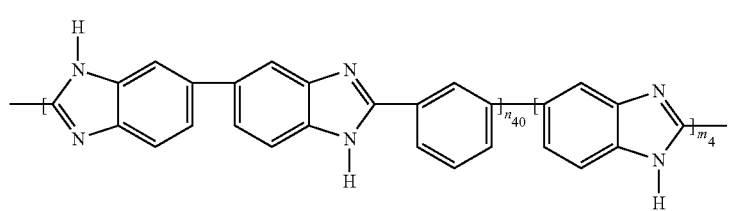
Formula 48
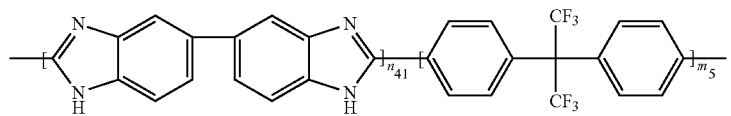
Formula 49
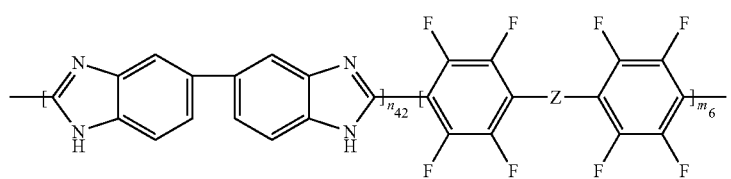

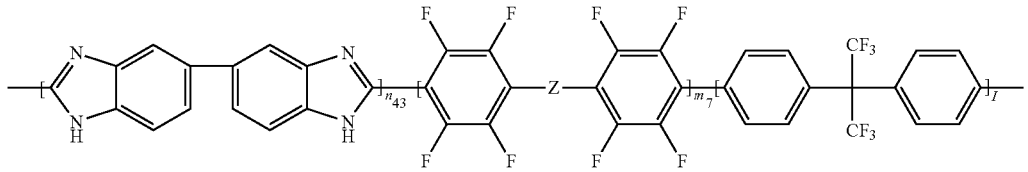

Formula 50

In Formulae 24 to 50, l, $n_{17}$ to $n_{43}$, and $m_3$ to $m_7$ may each be an integer of about 10 or greater, and in some embodiments, may be an integer of about 100 or greater, z may be a chemical bond, $-(CH_2)_S-$, $-C(=O)-$, $-SO_2-$, $-C(CH_3)_2-$, or $-C(CF_3)_2-$; and s may be an integer from 1 to about 5.

The azole-based polymer may be a compound including poly(2,2'-(m-phenylene)-5,5'-bibenzimidazole) (m-PBI) represented by Formula 51 below, or a compound including poly(2,2'-(p-phenylene)-5,5'-bibenzimidazole) (p-PBI) represented by Formula 52 below.

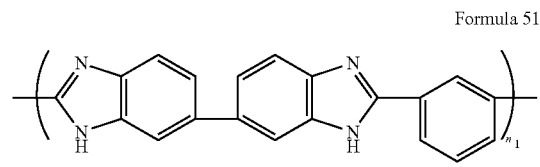

Formula 51

In Formula 51, $n_1$ is an integer of about 10 or greater.

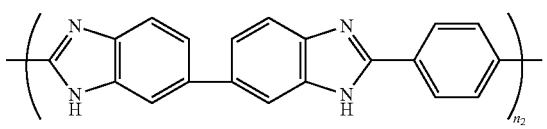

Formula 52

In Formula 52, $n_2$ is an integer of about 10 or greater.

The compounds of Formulae 51 and 52 may each have a number average molecular weight of about 1,000,000 or less.

For example, the azole-based polymer may be a benzimidazole-based polymer represented by Formula 53 below.

wherein, in Formula 53, $R_9$ and $R_{10}$ are each independently a hydrogen atom, an unsubstituted or substituted $C_1$-$C_{20}$ alkyl group, a unsubstituted or substituted $C_1$-$C_{20}$ alkoxy group, a unsubstituted or substituted $C_6$-$C_{20}$ aryl group, a unsubstituted or substituted $C_6$-$C_{20}$ aryloxy group, a unsubstituted or substituted $C_3$-$C_{20}$ heteroaryl group, or a unsubstituted or substituted $C_3$-$C_{20}$ heteroaryloxy group, wherein $R_9$ and $R_{10}$ may be linked to form a $C_4$-$C_{20}$ carbon ring or a $C_3$-$C_{20}$ heteroatom containing carbon ring;

$Ar^{12}$ is a substituted or unsubstituted $C_6$-$C_{20}$ arylene group or a substituted or unsubstituted $C_3$-$C_{20}$ heteroarylene group;

$R_{11}$ to $R_{13}$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_6$-$C_{20}$ aryl group, a substituted or unsubstituted $C_6$-$C_{20}$ aryloxy group, a substituted or unsubstituted $C_6$-$C_{20}$ heteroaryl group, or a substituted or unsubstituted $C_3$-$C_{20}$ heteroaryloxy group;

L represents a linker;

$m_1$ is from about 0.01 to about 1;

$a_1$ is 0 or 1;

$n_3$ is a number from 0 to about 0.99; and k is a number from about 10 to about 250.

The benzimidazole-based polymer may include a compound represented by Formula 54 or a compound represented by Formula 55:

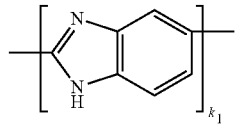

Formula 54

In Formula 54, $k_1$ represents a degree of polymerization and is a number from about 10 to about 300.

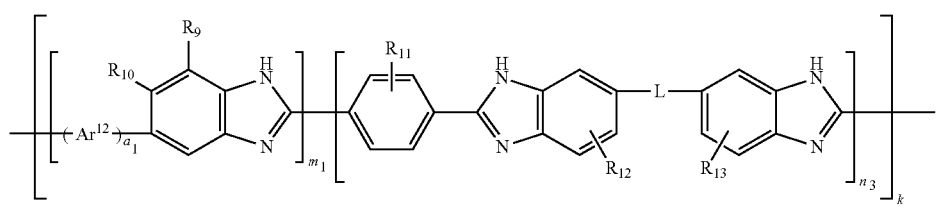

Formula 53

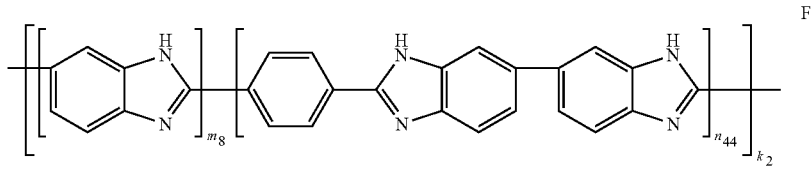

Formula 55

In Formula 55, $m_8$ is a number from about 0.01 to about 1, and in some embodiments, may be a number from about 1 or a number from about 0.1 to about 0.9; and $n_{44}$ is a number from about 0 to about 0.99, and in some embodiments, may be 0 or a number from about 0.1 to about 0.9; and $k_2$ is a number from about 10 to about 250.

Hereinafter, the compounds represented by Formulae 4 to 9 will be described in greater detail.

Examples of the at least one of compounds of Formula 4 are compounds represented by Formulae 56 to 104.

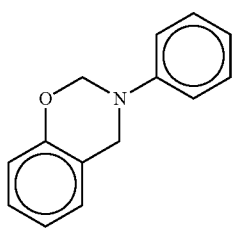

Formula 56

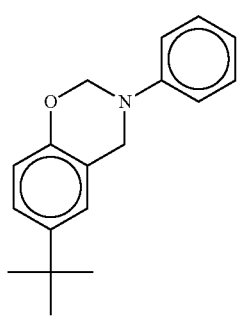

Formula 57

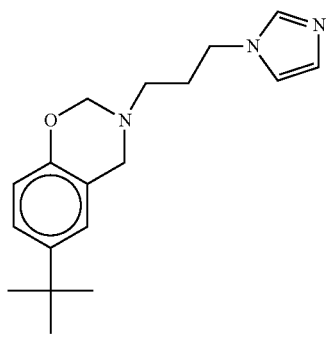

Formula 58

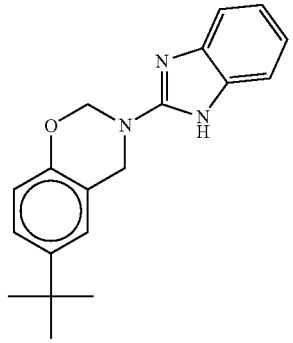

-continued

Formula 59

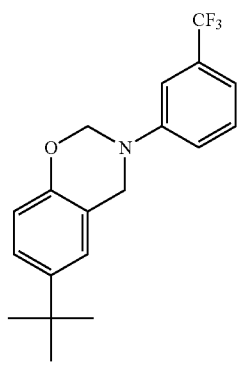

Formula 60

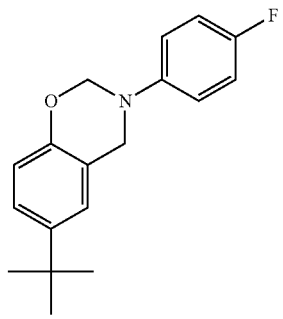

Formula 61

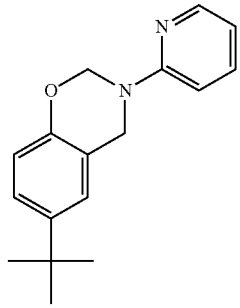

Formula 62

-continued
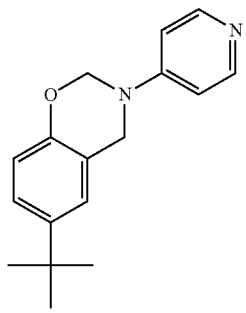
Formula 63
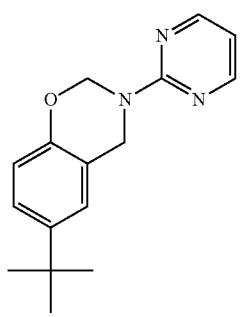
Formula 64
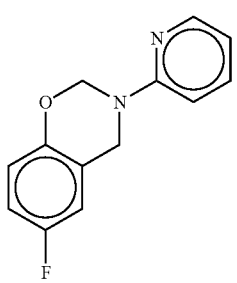
Formula 65
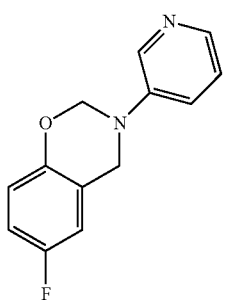
Formula 66
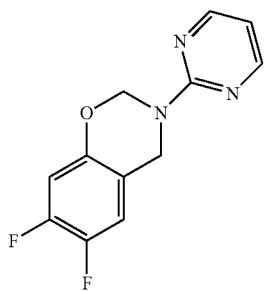
Formula 67
-continued
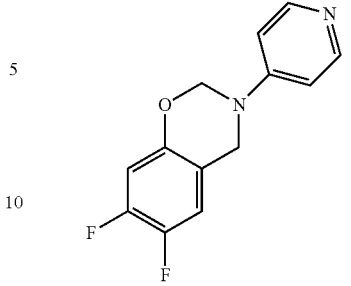
Formula 68
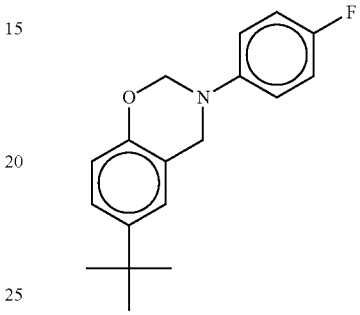
Formula 69
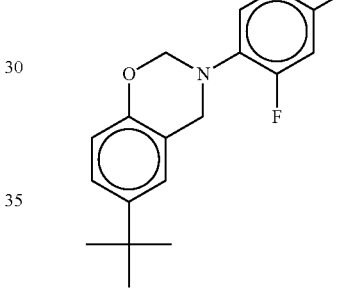
Formula 70
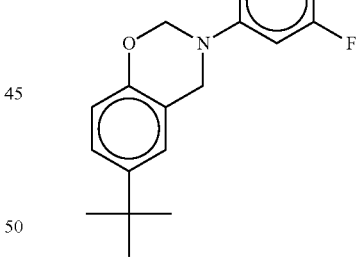
Formula 71
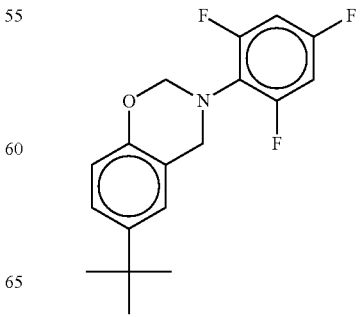
Formula 72

Formula 73
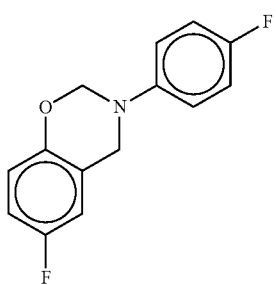
Formula 74
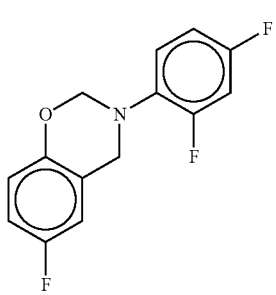
Formula 75
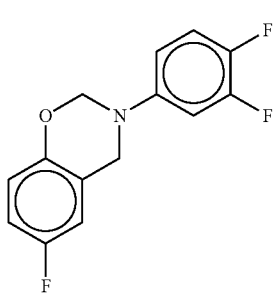
Formula 76
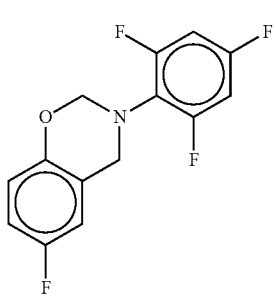
Formula 77
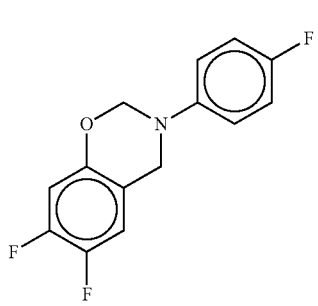
Formula 78
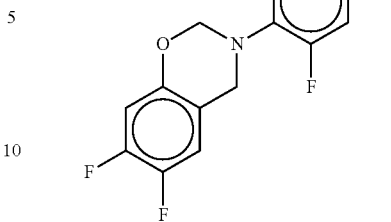
Formula 79
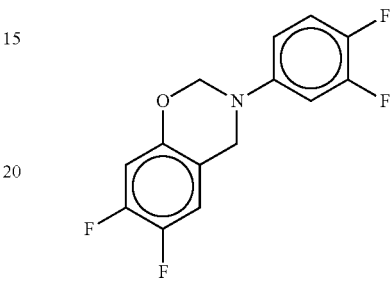
Formula 80
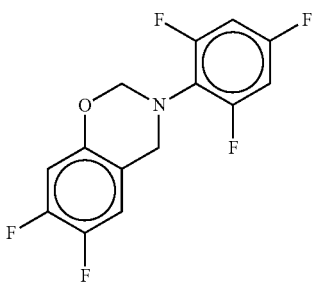
Formula 81
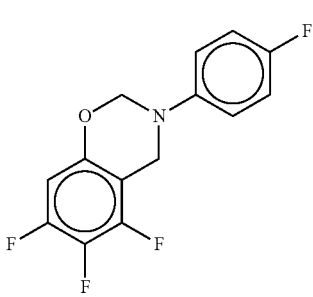
Formula 82
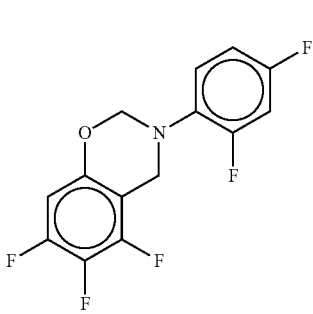

Formula 83
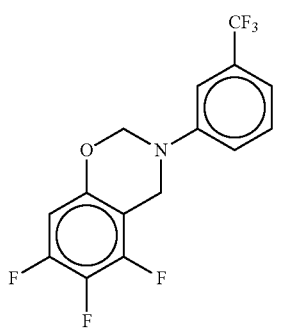
Formula 88
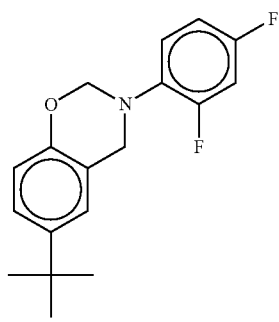
Formula 84
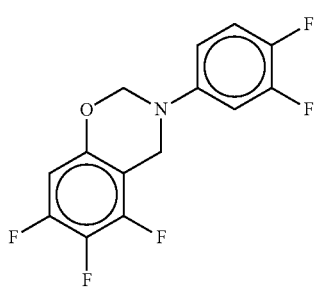
Formula 89
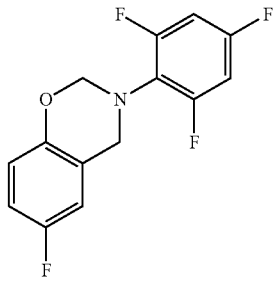
Formula 85
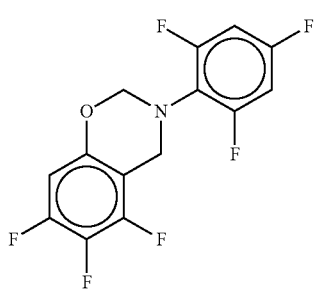
Formula 90
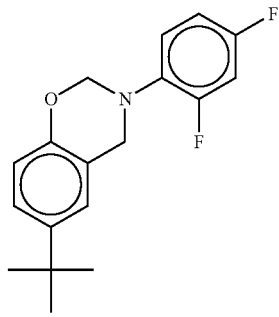
Formula 86
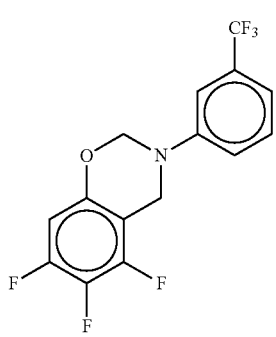
Formula 91
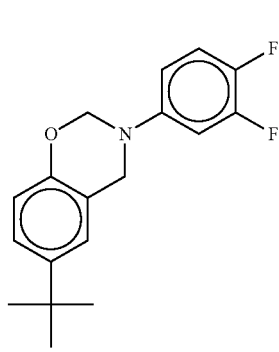
Formula 87
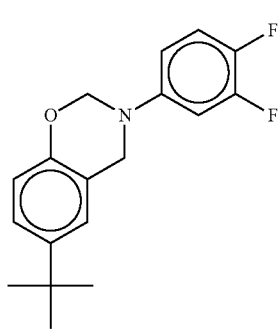
Formula 92
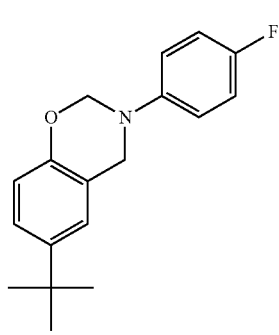

Formula 93
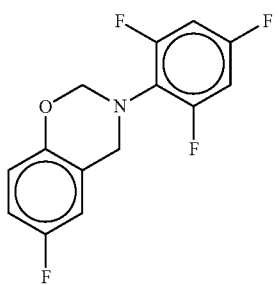
Formula 94
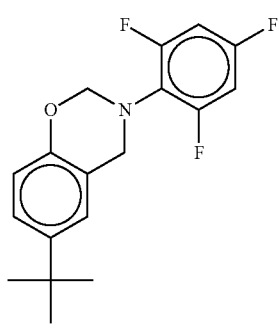
Formula 95
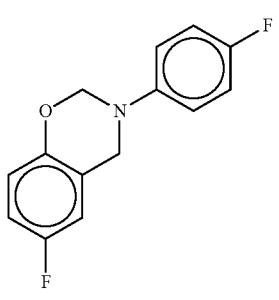
Formula 96
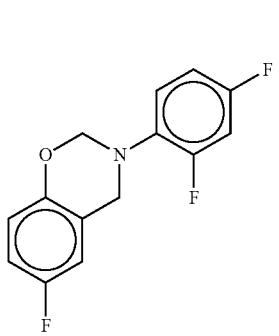
Formula 97
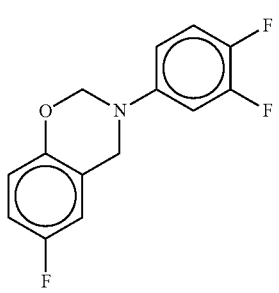
Formula 98
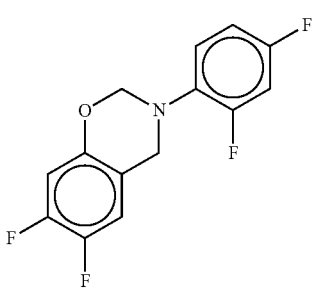
Formula 99
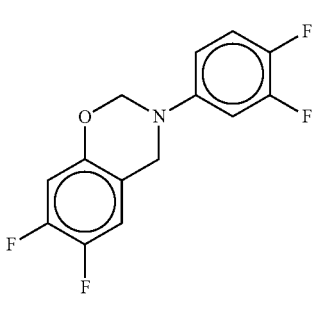
Formula 100
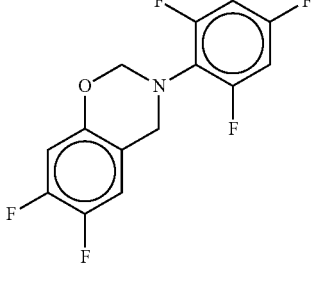
Formula 101
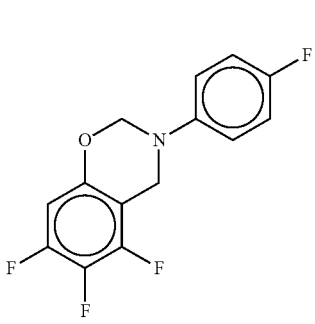
Formula 102
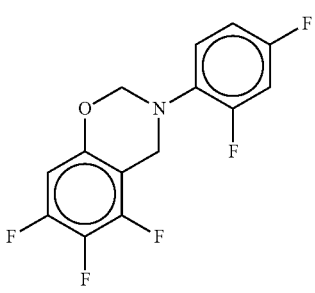

Formula 103
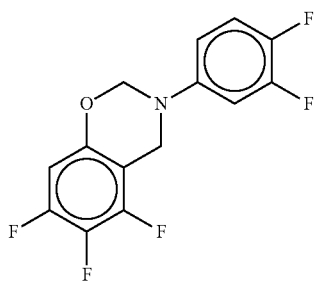
Formula 104
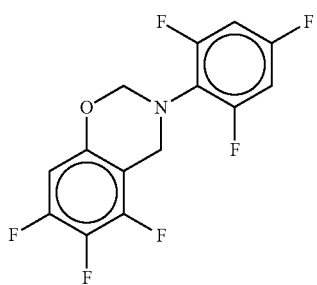
Examples of the at least one of compounds of Formula 5 are compounds represented by Formulae 105 to 109.
Formula 105
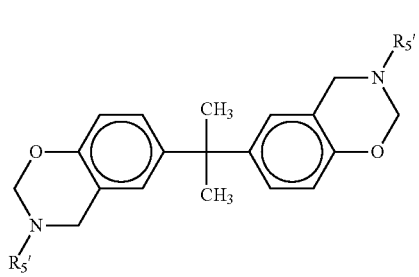
Formula 106
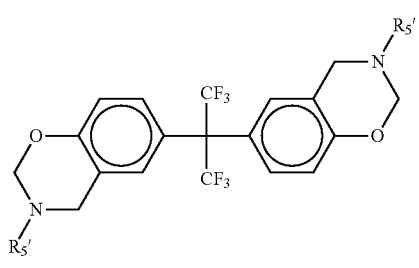
Formula 107
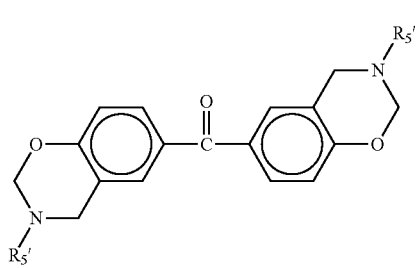
Formula 108
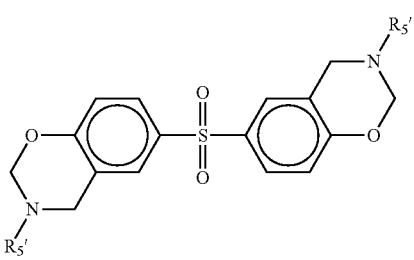
Formula 109
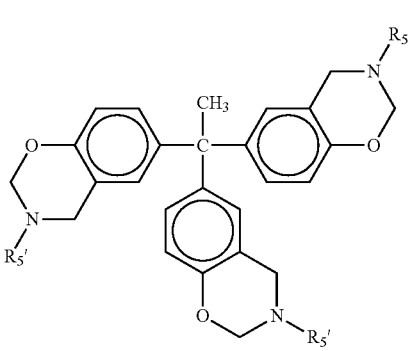
In Formulae 105 to 109, $R_{5'}$ is —$CH_2$—CH=$CH_2$ or a group represented by Formula 110.
Formula 110
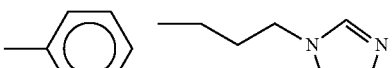
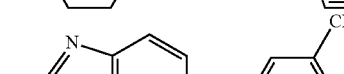
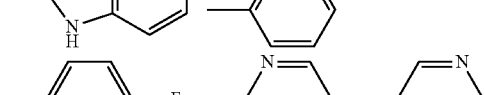
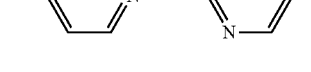
Examples of the at least one of compounds of Formula 5 are also compounds represented by Formulae 111 to 114.
Formula 111
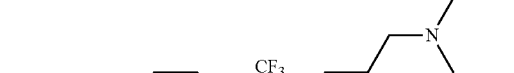
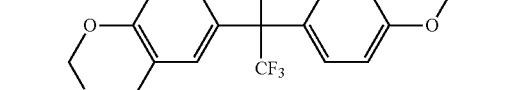

-continued
Formula 112
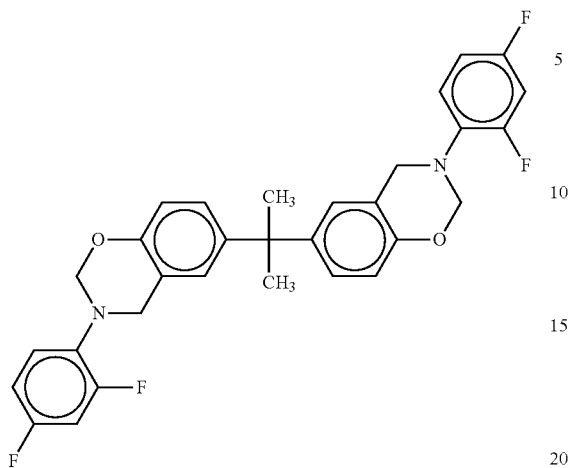
Formula 113
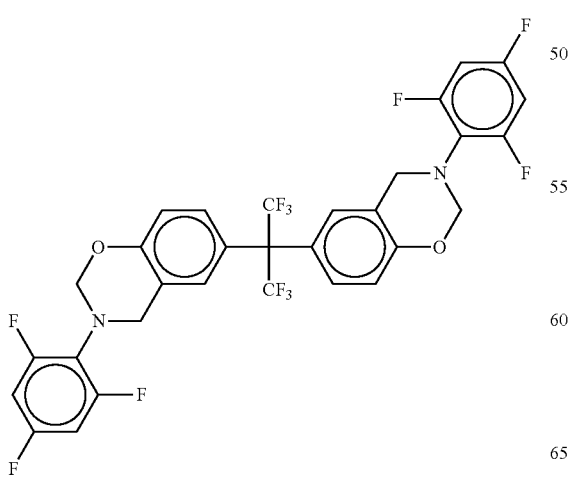
Formula 114
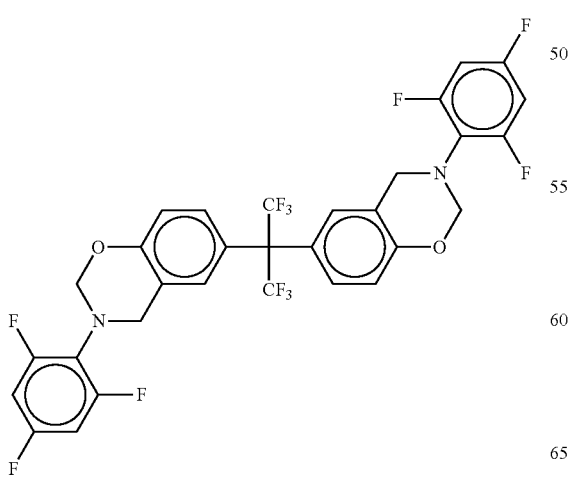
Examples of the at least one of compounds of Formula 6 are compounds represented by Formulae 115 to 118:
Formula 115
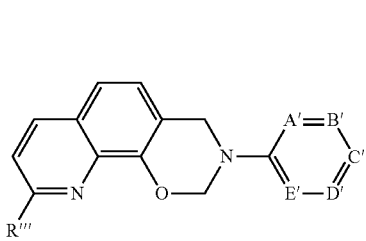
In Formula 115, R''' is a hydrogen atom or a $C_1$-$C_{10}$ alkyl group.
Formula 116
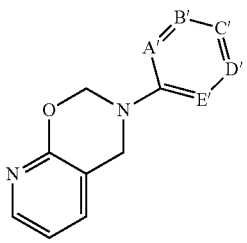
Formula 117
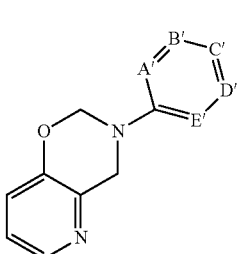
Formula 118
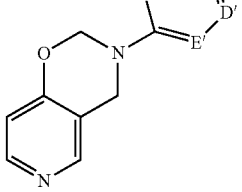
In Formulae 115 to 118,
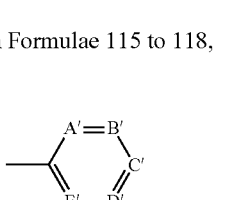
is selected from among groups presented by Formula 118A.
Formula 118A
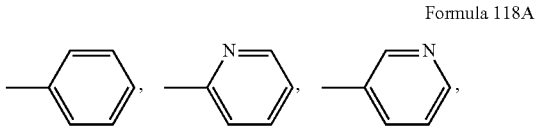

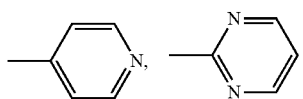
Examples of the at least one of compounds of Formula 6 also include compounds represented by Formulae 119 to 139:
Formula 119
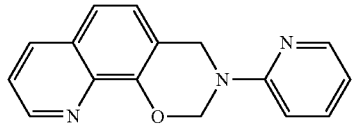
Formula 120
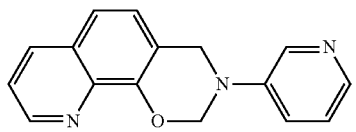
Formula 121
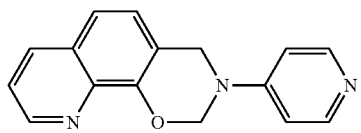
Formula 122
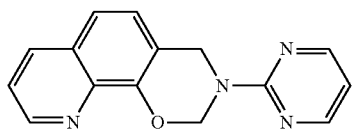
Formula 123
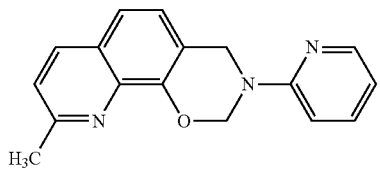
Formula 124
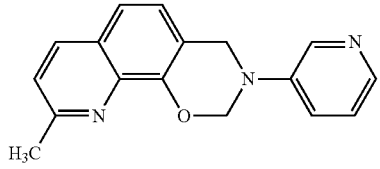
Formula 125
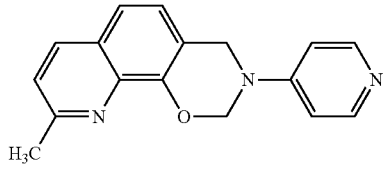
Formula 126
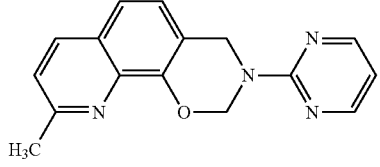
Formula 127
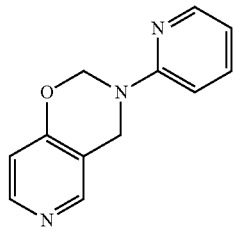
Formula 128
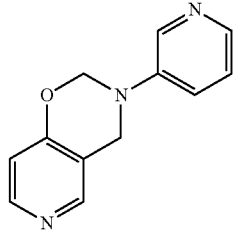
Formula 129
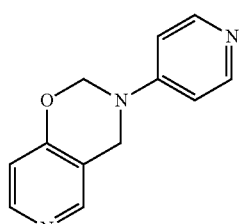
Formula 130
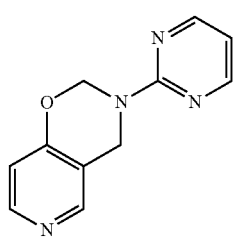
Formula 131
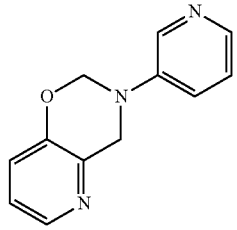
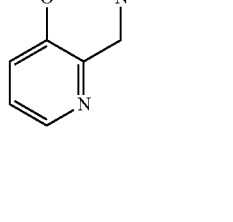
Formula 132
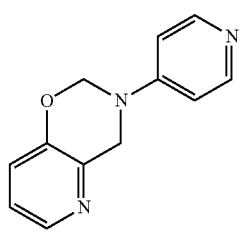
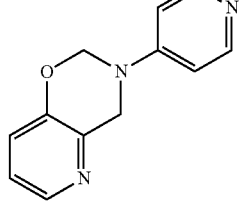

-continued

Formula 133

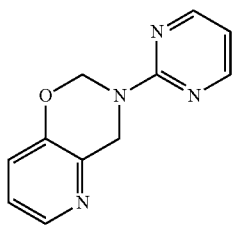

Formula 134

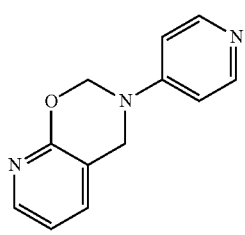

Formula 135

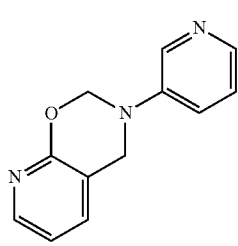

Formula 136

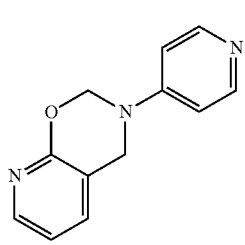

Formula 137

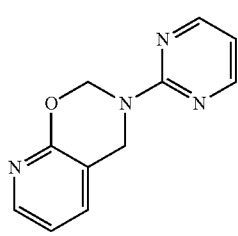

Formula 138

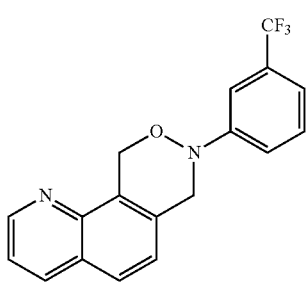

-continued

Formula 139

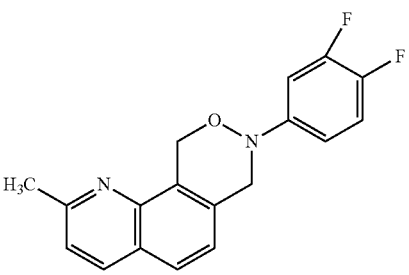

In the at least one of compounds of Formula 7, A' may be a group represented by Formula 140 or 141:

Formula 140

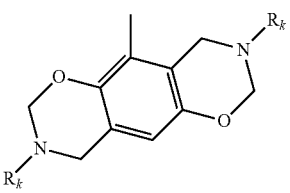

Formula 141

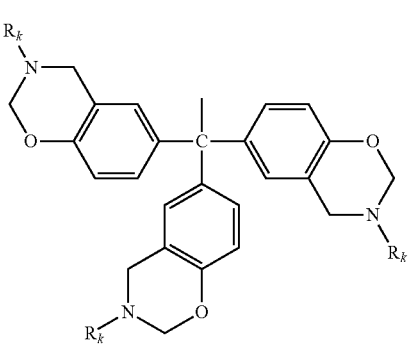

In Formulae 140 and 141, $R_k$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_2$-$C_{20}$ heteroaryl group, a $C_2$-$C_{20}$ heteroaryloxy group, a halogenated $C_2$-$C_{20}$ heteroaryl group, a halogenated $C_2$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group.

Examples of the at least one of compounds of Formula 7 are compounds represented by Formulae 142 and 143:

Formula 142

Formula 143
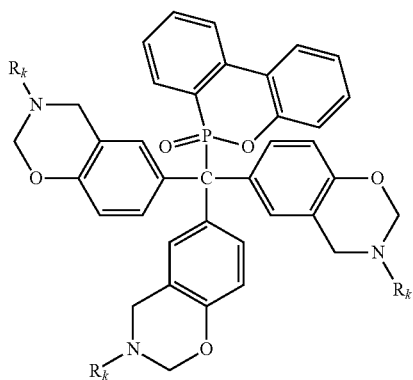
In Formula 142 and 143, $R_k$ is selected from groups represented by Formula 143A:
Formula 143A
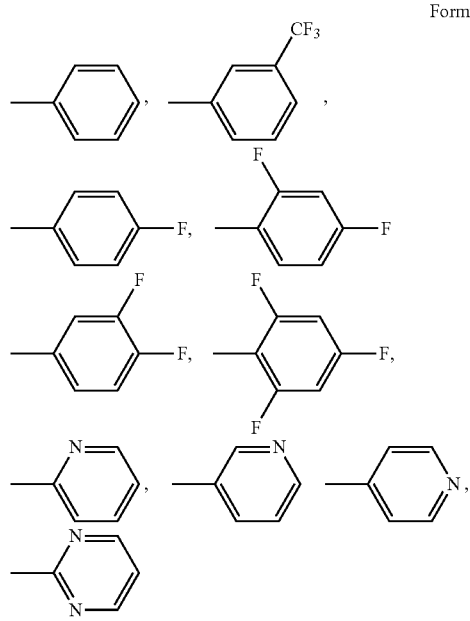
Examples of the at least one of compounds of Formula 7 are compounds represented by Formulae 144 to 149:
Formula 144
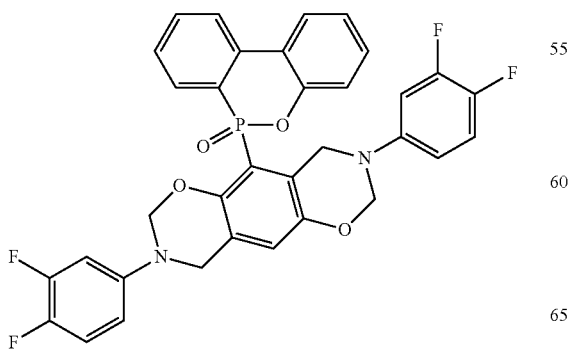
Formula 145
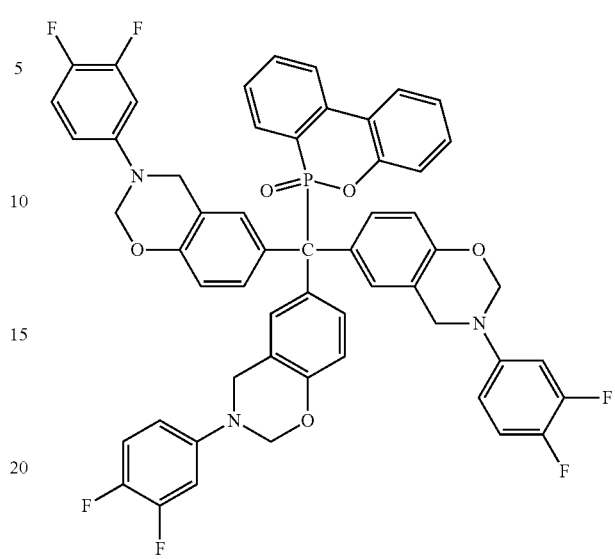
Formula 146
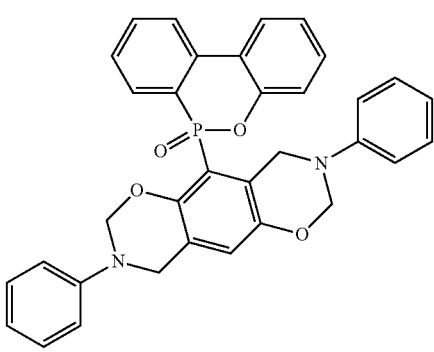
Formula 147
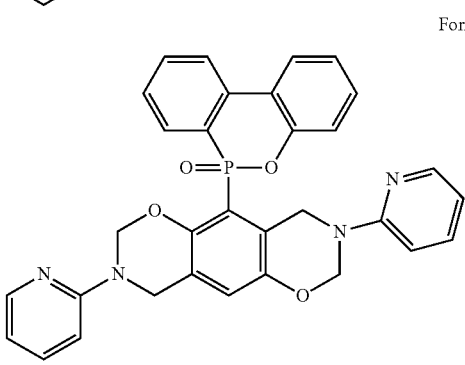
Formula 148
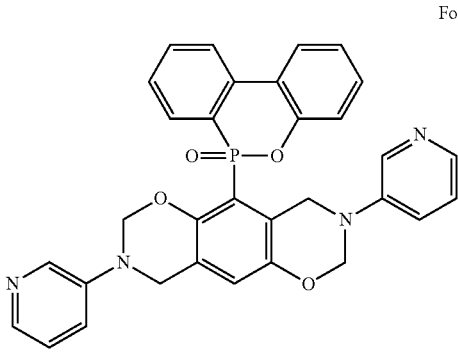

Formula 149

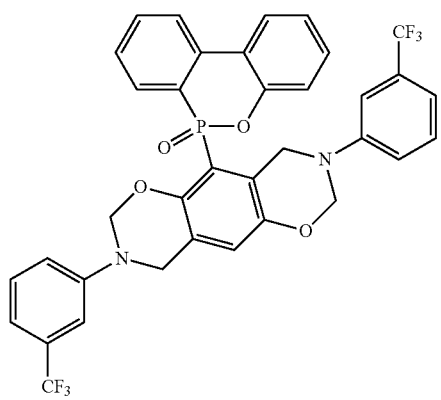

Examples of the at least one of compounds of Formula 8 are compounds represented by Formulae 150, 151, and 152:

Formula 150

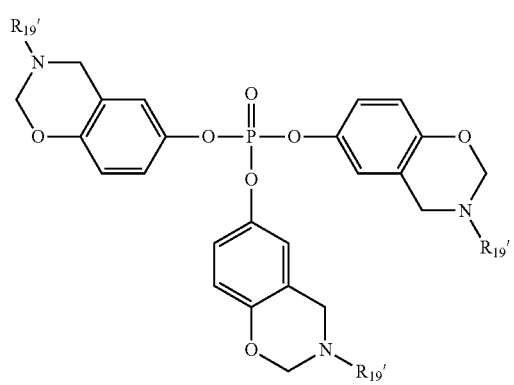

Formula 151

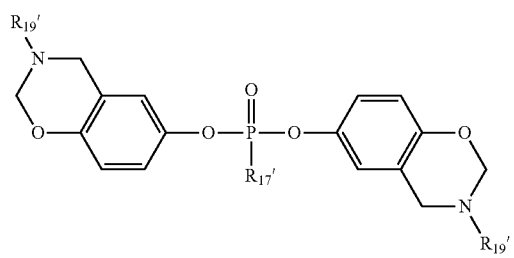

In Formulae 150 and 151, $R_{17}'$ is a $C_1$-$C_{10}$ alkyl group, a $C_1$-$C_{10}$ alkoxy group, a $C_6$-$C_{10}$ aryl group or a $C_6$-$C_{10}$ aryloxy group;

$R_{19}'$ is selected from groups represented by Formulae 151A:

Formula 151A

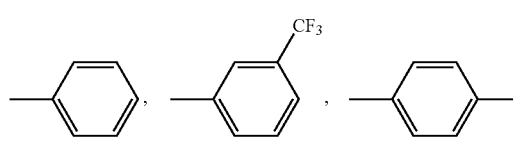

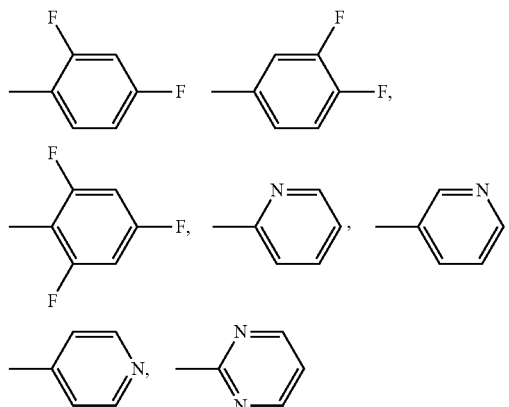

Formula 152

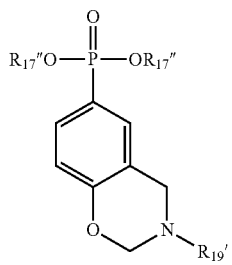

In Formula 152, $R_{17}''$ is a $C_6$-$C_{10}$ aryl group; and $R_{19}''$ is selected from groups represented by Formula 152A:

Formula 152A

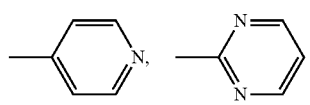

Examples of the at least one of compounds represented by Formula 8 are also compounds represented by Formulae 153 and 154.

Formula 153
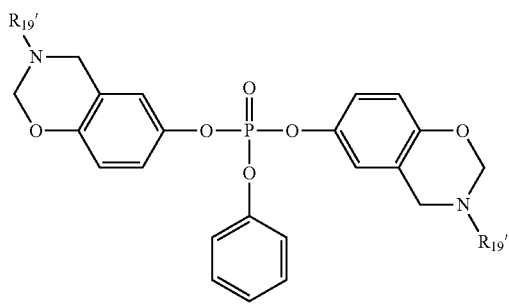
Formula 154
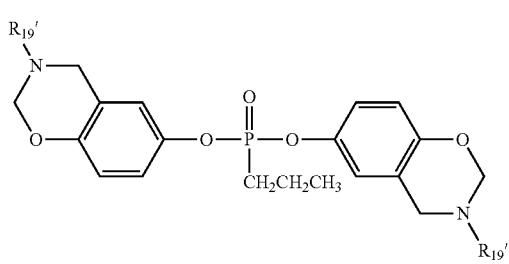
In Formulae 153 and 154, R₁₉' is selected from groups represented by Formulae 154A:
Formula 154A
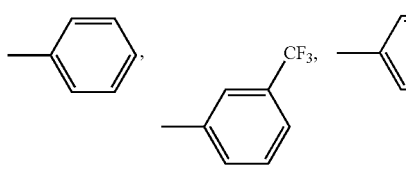
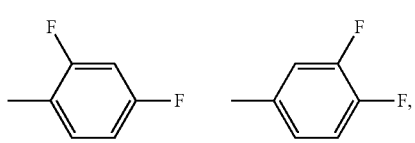
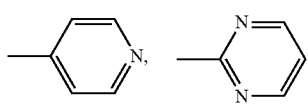
Examples of the at least one of compounds represented by Formula 8 are also compounds represented by Formulae 155 to 161:
Formula 155
Formula 156
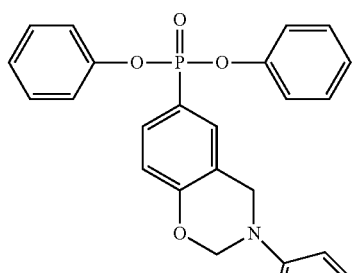
Formula 157
Formula 158
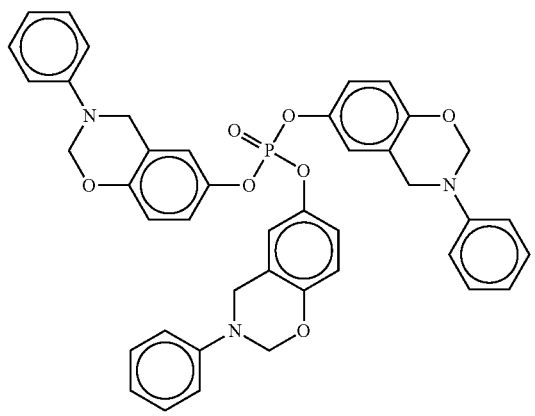

-continued

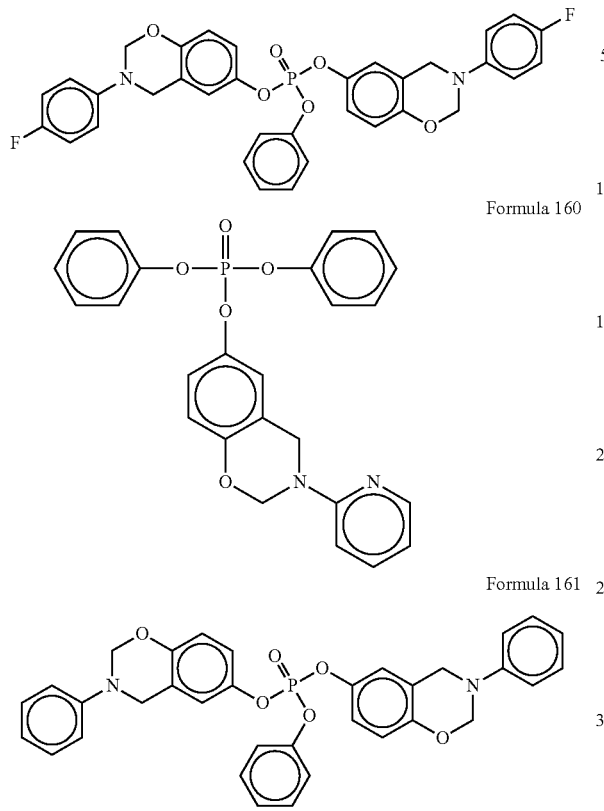

Formula 159

Formula 160

Formula 161

Examples of the at least one of compounds represented by Formula 9 are compounds represented by Formulae 162 to 164.

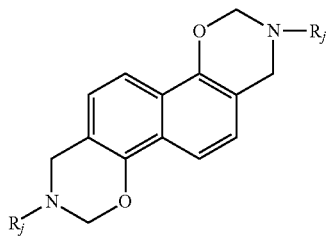

Formula 162

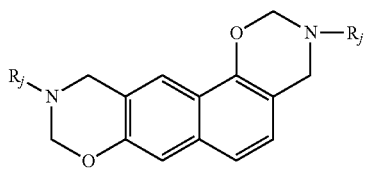

Formula 163

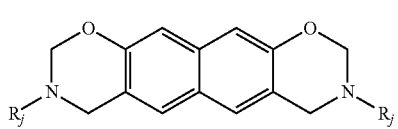

Formula 164

In Formulae 162 to 164, $R_j$ is selected from groups represented by Formulae 164A:

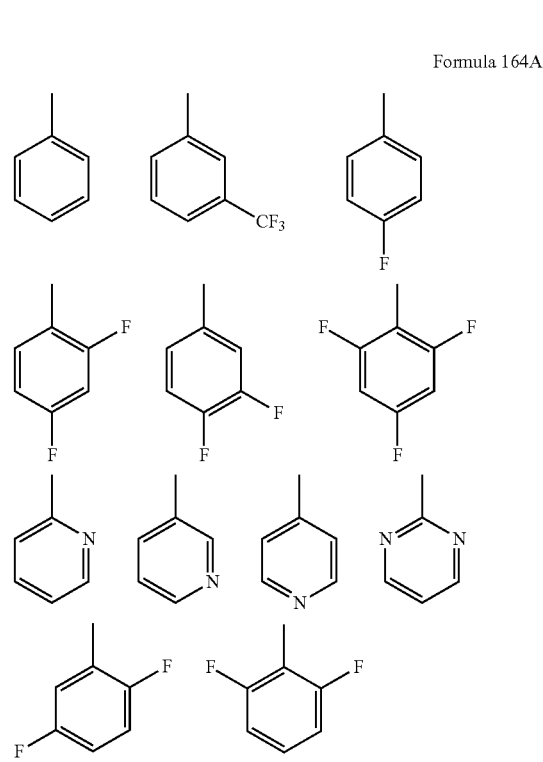

Formula 164A

Examples of the at least one of compounds represented by Formula 9 are also compounds represented by Formulae 165 to 172.

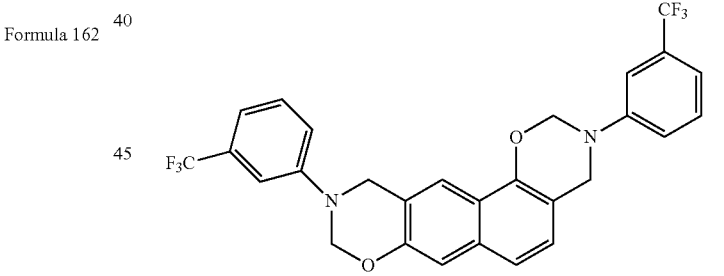

Formula 165

Formula 166

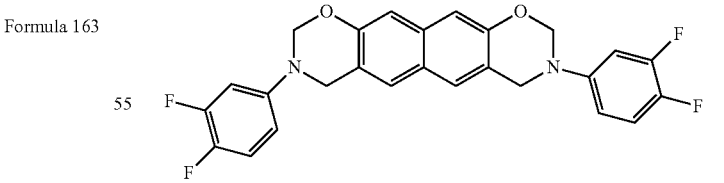

Formula 167

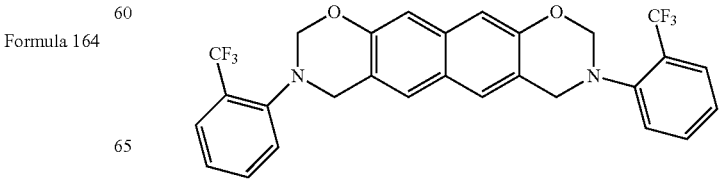

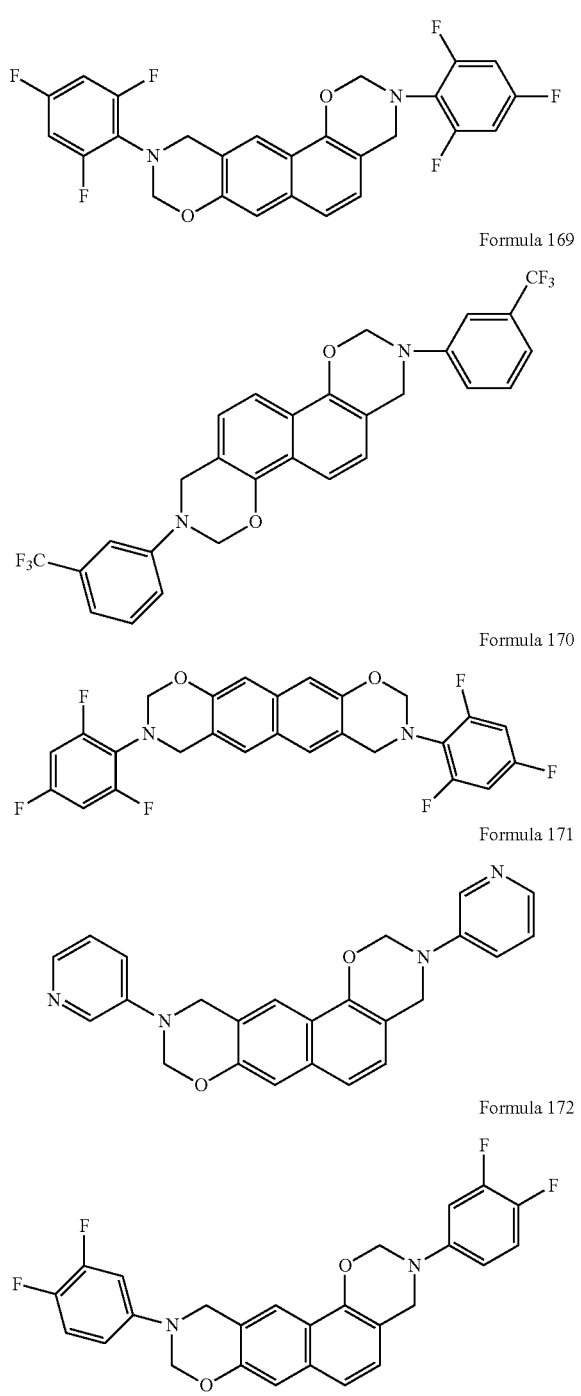

Formula 168

Formula 169

Formula 170

Formula 171

Formula 172

The azole-based polymer may be 2,5-polybenzimidazole, poly(2,2'-(m-phenylene)-5,5'-bibenzimidazole) ("m-PBI"), or poly(2,2'-(p-phenylene)-5,5'-bibenzimidazole) ("p-PBI").

The composite membrane may each further include a phosphoric acid-based material.

Examples of the phosphoric acid-based material are phosphoric acid, polyphosphoric acid, phosphonic acid ($H_3PO_3$), ortho-phosphoric acid ($H_3PO_4$), pyro-phosphoric acid ($H_4P_2O_7$), triphosphoric acid ($H_5P_3O_{10}$), meta-phosphoric acid, and a derivative thereof. In an embodiment, the phosphoric acid-based material may be phosphoric acid.

A concentration of the phosphoric acid-based material may be from about 80 wt % to about 100 wt %, and in some embodiments, may be about 85 wt %. When an 85 wt % aqueous phosphoric acid solution is used as the phosphoric acid-based material, the amount of the phosphoric acid-based material may be from about 1 part to about 500 parts by weight based on 100 parts by weight of the at least one of compounds of Formula 1. When the amount of the phosphoric acid-based material is within these ranges, a composite membrane and an electrolyte membrane each with high conductivity and strong mechanical characteristics may be manufactured.

According to another embodiment of the present disclosure, there is provided a method of manufacturing a composite membrane that includes a composite which is a polymerization product of the at least one of compounds represented by Formula 1 above and the cross-linkable compound, or that includes a composite of the at least one of compounds of Formula 1, the cross-linkable compound, and the at least one of compounds represented by Formulae 4 to 9.

Initially, the at least one of compounds represented by Formula 1 above and the cross-linkable compound are mixed together to obtain a composition.

Afterward, the composition is subjected to coating and thermal treatment to obtain a composite membrane that contains the composite.

The coating of the composition is not limited to a specific method, and may be performed by dipping, spray coating, screen printing, coating using Gravure coating, dip coating, roll coating, comma coating, silk screen printing, or a combination of these methods.

In an embodiment, the coating of the composition may be performed by applying the composition to a substrate, leaving the substrate at a predetermined temperature to allow the composition to uniformly spread over the substrate, and shaping the composition in membrane form having a predetermined thickness by using a coater, such as a doctor blade.

The mixing of the at least one of compounds of Formula 1 and the cross-linkable compound is not limited in terms of the order of adding each component, and solvent use.

In the mixing, for example, the cross-linkable compound, the at least one of compounds represented by Formula 1, and a first solvent may be mixed together at the same time. Through this mixing process, individual components in the composition may be uniformly dispersed and mixed, which may improve workability in forming a composite membrane using the composition.

In an embodiment, the at least one of compounds represented by Formulae 4 to 9 may further be added to the composition, and in some embodiments, the at least one of compounds represented by Formulae 4 to 9 may be added along with a second solvent.

In mixing the cross-linkable compound, the at least one of compounds represented by Formula 1, and the first solvent, a ball mill (for example, a planetary ball mill) may be used for the purpose of grinding.

The thermal treatment may be performed at a temperature from room temperature (i.e., about 20° C. to about 25° C.) to about 300° C., and in some embodiments, may be performed at about 150° C. When the thermal treatment is performed within these temperature ranges, a composite membrane with improved mechanical properties may be attainable.

Non-limiting examples of the first and second solvents are ether, tetrahydrofuran, dimethoxyethane, 1,4-dioxane, dimethyl sulfoxide, N-methylpyrrolidone, N,N'-dimethylacetamide, and N,N'-dimethylformamide.

Amounts of the first and second solvents depend on the amount of the at least one of compounds of Formula 1. In some embodiments, the amount of the first solvent may be from about 100 parts to about 1,000 parts by weight based on 100 parts by weight of a total weight of the at least one of compounds represented by Formula 1. The amount of the second solvent may be from about 100 parts to about 1,000 parts by weight based on 100 parts by weight of a total weight of the at least one of compounds of Formulae 4 to 9.

When the amounts of the first and second solvents are within these ranges, the composition may have an appropriate solid content with an appropriate viscosity, which may improve workability in forming the composite membrane using the composition.

In an embodiment, the composition may be coated on a substrate and thermally treated to form a film, which is then separated from the substrate, thereby obtaining a composite membrane.

The thermal treatment may be performed at a temperature of about 150° C. to about 250° C. When the thermal treatment is performed within this temperature range, a composite membrane with high conductivity may be obtained having a uniform thickness without a reduction in mechanical strength.

The substrate is not specifically limited. For example, the substrate may be any of a variety of supports, such as a glass substrate, a release film, or an anode electrode.

Non-limiting examples of the release film are a polytetrafluoroethylene film, a polyvinylidenefluoride film, a polyethyleneterepthalate film, and a biaxially stretched polyester (mylar) film.

When used as an electrolyte membrane, a phosphoric acid-based material is supplied to the electrolyte membrane. When the phosphoric acid-based material is supplied, a reaction temperature may be from about 30° C. to about 120° C., and in another embodiment, may be at about 60° C.

The phosphoric acid-based material may be supplied to the electrolyte membrane in a variety of manners. For example, the electrolyte membrane may be immersed in the phosphoric acid-based material.

The electrolyte membrane prepared through the above-described processes may have a thickness of about 1 micrometer ("μm") to about 100 μm, and in some embodiments, may have a thickness of about 30 μm to about 90 μm, specifically, from about 40 μm to about 80 μm. The composite membrane may be formed as a thin film having a thickness as defined above.

The electrolyte membrane may be used as a non-humidified proton conductor, and may be used in a fuel cell operating in high-temperature, non-humidified conditions. The term "high temperature" refers to a temperature of about 250° C. to about 400° C.; however, the high temperature is not particularly limited.

According to an aspect of the present disclosure, provided is a fuel cell that includes the above-described composite membrane as an electrolyte membrane disposed between a cathode and an anode. The fuel cell may have high efficiency characteristics because it exhibits high proton conductivity and lifetime characteristics at high temperatures in non-humidified conditions.

The fuel cell may be used for any purpose. For example, the fuel cell may be used to implement a solid oxide fuel cell ("SOFC"), a proton exchange membrane fuel cell ("PEM-FCs"), and the like.

Figure 2:
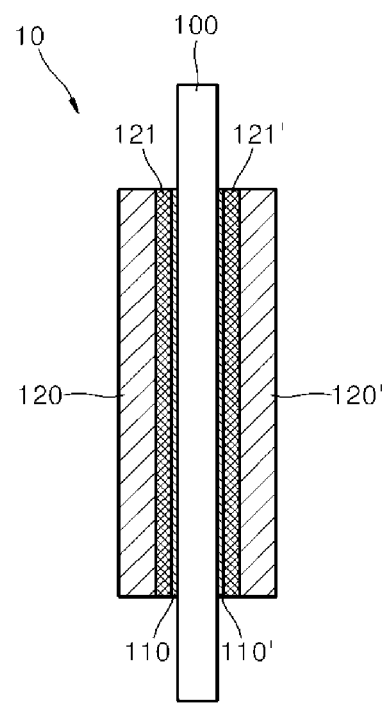
FIG. 2 is a cross-sectional diagram of a membrane-electrode assembly ("MEA") forming the fuel cell of FIG. 1.

FIG. 1 is a perspective exploded view of a fuel cell 1 according to an embodiment of the present disclosure. FIG. 2 is a cross-sectional diagram of a membrane-electrode assembly ("MEA") that forms the fuel cell 1 of FIG. 1.

Referring to FIG. 1, the fuel cell 1 includes two unit cells 11 that are supported by a pair of holders 12. Each unit cell 11 includes a MEA 10, and bipolar plates 20 disposed on lateral sides of the MEA 10. Each bipolar plate 20 includes a conductive metal, carbon or the like, and operates as a current collector, while providing oxygen and fuel to the catalyst layers of the corresponding MEA 10.

Although only two unit cells 11 are shown in FIG. 1, the number of unit cells is not limited to two and a fuel cell may have even several tens or hundreds of unit cells, depending on the required properties of the fuel cell.

As shown in FIG. 2, the MEA 10 includes an electrolyte membrane 100, catalyst layers 110 and 110' disposed on lateral sides of the electrolyte membrane 100, and first gas diffusion layers 121 and 121' respectively stacked on the catalyst layers 110 and 110', and second gas diffusion layers 120 and 120' respectively stacked on the first gas diffusion layers 121 and 121'.

The electrolyte membrane 100 may include the composite membrane according to an embodiment of the present disclosure.

The catalyst layers 110 and 110' respectively operate as a fuel electrode and an oxygen electrode, each including a catalyst and a binder therein. The catalyst layers 110 and 110' may further include a material that may increase the electrochemical surface area of the catalyst.

The first gas diffusion layers 121 and 121' and the second gas diffusion layers 120 and 120' may each be formed of a material such as, for example, carbon sheet or carbon paper. The first gas diffusion layers 121 and 121' and the second gas diffusion layers 120 diffuse oxygen and fuel supplied through the bipolar plates 20 into the entire surfaces of the catalyst layers 110 and 110'.

The fuel cell 1 including the MEA 10 operates at a temperature of about 250° C. to about 300° C. Fuel such as hydrogen is supplied through one of the bipolar plates 20 into a first catalyst layer, and an oxidant such as oxygen is supplied through the other bipolar plate 20 into a second catalyst layer. Then, hydrogen is oxidized into protons in the first catalyst layer, and the protons conduct to the second catalyst layer through the electrolyte membrane 4. Then, the protons electrochemically react with oxygen in the second catalyst layer to produce water and electrical energy. Hydrogen produced from reformation of hydrocarbons or alcohols may be supplied as the fuel. Oxygen as the oxidant may be supplied in the form of air.

Hereinafter, a method of manufacturing a fuel cell using the electrolyte membrane, according to an embodiment of the present disclosure will be described.

Electrodes for a fuel cell that each includes a catalyst layer containing a catalyst and a binder may be used.

The catalyst may be platinum (Pt), an alloy or a mixture of platinum (Pt) and at least one metal selected from the group including gold (Au), palladium (Pd), rhodium (Ru), iridium (Ir), ruthenium (Ru), tin (Sn), molybdenum (Mo), cobalt (Co), and chromium (Cr). The Pt, the alloy, or the mixture may be supported on a carbonaceous support. For example, the catalyst may be at least one selected from the group including Pt, a PtCo alloy, and a PtRu alloy. These metals may be supported on a carbonaceous support.

The binder may be at least one of polyvinylidenefluoride, polytetrafluoroethylene, a tetrafluoroethylene-hexafluoropropylene copolymer, and perfluoroethylene. The amount of the binder may be in the range of about 0.001 to about 0.5 parts by weight based on 1 part by weight of the catalyst.

When the amount of the binder is within this range, the electrode catalyst layer may have strong binding ability to the support.

According to an embodiment, the fuel cell may be manufactured by disposing the electrolyte membrane that includes a composite which is a polymerization product of at least one of compounds of Formula 1 and a cross-linkable compound, or that includes a composite which is a polymerization product of at least one of compounds represented by Formula 1, a cross-linkable compound, and at the least one of compounds represented by Formulae 4 to 9, between the electrodes.

In some embodiments, the composition containing the at least one selected from compounds represented by Formula 1 and a cross-linkable material, or the composite prepared from the composition may be used to form an electrode for a fuel cell.

The composition may further include the at least one of compounds represented by Formulae 4 to 9.

According to an embodiment of the present disclosure, a method of forming an electrode for a fuel cell may involve dispersing a catalyst in a third solvent to obtain a dispersion.

The third solvent may be N-methylpyrrolidone ("NMP"), N,N-dimethylacetamide ("DMAC"), or the like. An amount of the third solvent may be from about 100 parts to about 1,000 parts by weight based on 100 parts by weight of the catalyst.

The at least one of compounds of Formula 1, an azole-based polymer, and the at least one of compounds of Formulae 2 to 7 may be added to the dispersion and mixed together, thereby forming a composition for forming an electrode catalyst layer. A binder may further be added to the composition.

The composition for an electrode catalyst layer may be coated on the surface of a carbon support, thereby completing formation of the electrode. Herein, the carbon support may be fixed on a glass substrate to facilitate the coating. The coating method is not particularly limited, but examples of the coating method may be coating using a doctor blade, bar coating, screen printing, and the like.

The coating of the composition for forming the electrode catalyst layer may be followed by thermal treatment, which may be performed at a temperature of about 20° C. to about 150° C.

The final electrode for a fuel cell may include the composition that includes the at least one of compounds of Formula 1, a cross-linkable compound, or that includes the at least one of compounds of Formula 1, a cross-linkable compound, and the at least one of compounds of Formulae 4 to 9. In some other embodiments, through the above-described thermal treatment and/or operation of a fuel cell including the electrode, the electrode may contain a composite that is a polymerization product of the at least one of compounds of Formula 1 and the cross-linkable compound, or that is a polymerization product of the at least one of compounds of Formula 1, the cross-linkable compound, and the at least one of compounds represented by Formulae 4 to 9.

Substituents in the formulae above may be defined as follows.

As used herein, the term "substituted" indicates a compound or radical substituted with at least one (e.g., 1, 2, 3, 4, 5, 6 or more) substituents independently selected from a halide (e.g., F—, Cl—, Br—, I—), a hydroxyl, an alkoxy, a cyano, an amino, a $C_1$ to $C_{20}$ alkyl, a $C_2$ to $C_{16}$ alkynyl, a $C_6$ to $C_{20}$ aryl, a $C_7$ to $C_{13}$ arylalkyl, a $C_1$ to $C_{20}$ heteroalkyl, a $C_3$ to $C_{20}$ heteroaryl, a $C_3$ to $C_{20}$ heteroarylalkyl, a $C_3$ to $C_{20}$ cycloalkyl, a $C_5$ to $C_{15}$ heterocycloalkyl, or a combination including at least one of the foregoing, instead of hydrogen, provided that the substituted atom's normal valence is not exceeded.

As used herein, the term "alkyl" indicates a completely saturated, branched or unbranched (or a straight or linear) hydrocarbon group.

Non-limiting examples of the "alkyl" group are methyl, ethyl, n-propyl, isopropyl, n-butyl, isobutyl, sec-butyl, t-butyl, isopentyl, neopentyl, n-hexyl, 3-methylhexyl, 2,2-dimethylpentyl, 2,3-dimethylpentyl, and n-heptyl.

At least one hydrogen atom of the alkyl group may be substituted with a halogen atom, a $C_1$-$C_{20}$ alkyl group substituted with a halogen atom (for example, —$CCF_3$, —$CHCF_2$, —$CH_2F$, —$CCl_3$, and the like), a $C_1$-$C_{20}$ alkoxy group, a $C_2$-$C_{20}$ alkoxyalkyl group, a hydroxyl group, a nitro group, a cyano group an amino group, an amidino group, hydrazine group, hydrazone group, a carboxyl group or a salt thereof, a sulfonyl group, a sulfamoyl group, a sulfonic acid group or a salt thereof, a phosphoric acid group or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_7$-$C_{20}$ arylalkyl group, a $C_2$-$C_{20}$ heteroaryl group, a $C_3$-$C_{20}$ heteroarylalkyl group, a $C_2$-$C_{20}$ heteroaryloxyl group, a $C_3$-$C_{20}$ heteroaryloxyalkyl group, or a $C_3$-$C_{20}$ heteroarylalkyl group.

The term "halogen atom" indicates fluorine, bromine, chloride, iodine, and the like.

The term "$C_1$-C20 alkyl group substituted with a halogen atom" indicates a $C_1$-$C_{20}$ alkyl group substituted with at least one halo group. Non-limiting examples of the $C_1$-$C_{20}$ alkyl group substituted with a halogen atom include monohaloalkyl, dihaloalkyl and polyhaloalkyl, including perhaloalkyl.

Monohaloalkyl indicate alkyl groups including one iodine, bromine, chlorine or fluorine. Dihaloalkyl and polyhaloalkyl indicate alkyl groups including at least two identical or different halo atoms.

As used herein, the term "halogenated" indicates a structural moiety substituted with one or more halogen atoms, in particular F, Br, Cl, or I.

As used herein, the term "cycloalkyl" indicates a monovalent group having one or more saturated rings in which all ring members are carbon (e.g., cyclopentyl and cyclohexyl).

As used herein, the term "alkoxy" represents "alkyl-O—", wherein the alkyl is the same as described above. Non-limiting examples of the alkoxy group are methoxy, ethoxy, propoxy, 2-propoxy, butoxy, t-butoxy, pentyloxy, hexyloxy, cyclopropoxy, and cyclohexyloxy. At least one hydrogen atom of the alkoxy group may be substituted with substituents that are the same as those recited above with reference to the alkyl group.

As used herein, the term "alkoxyalkyl" indicates an alkyl group with a substituent that is the same as that recited above with reference to the alkoxy group. At least one hydrogen atom of the alkoxyalkyl group be substituted with substituents that are the same as those recited above with reference to the alkyl group. As defined above, the term "alkoxyalkyl" refers to substituted alkoxyalkyl moieties.

As used herein, the term "alkenyl" indicates a branched or unbranched hydrocarbon with at least one carbon-carbon double bond. Non-limiting examples of the alkenyl group are vinyl, allyl, butenyl, isopropenyl, and isobutenyl. At least one hydrogen atom in the alkenyl group may be substituted with a substituent that is the same as that recited above with reference to the alkyl group.

As used herein, the term "alkynyl" indicated a branched or unbranched hydrocarbon with at least one carbon-carbon triple bond. Non-limiting examples of the "alkynyl" group are ethynyl, butynyl, isobutynyl, and isopropynyl.

At least one hydrogen atom of the alkynyl groups may be substituted by the same substituents as those recited in the above definition of the alkyl group.

As used herein, the term "aryl" group, which is used alone or in combination, indicates an aromatic hydrocarbon containing at least one ring.

The term "aryl" is construed as including a group with an aromatic ring fused to at least one cycloalkyl ring.

Non-limiting examples of the "aryl" group are phenyl, naphthyl, and tetrahydronaphthyl.

At least one hydrogen atom in the aryl group may be substituted with the same substituent as described above in connection with the alkyl group.

The term "arylalkyl" indicates an alkyl group substituted with an aryl group. Non-limiting examples of the "arylalkyl" group are benzyl and phenyl-$CH_2CH_2$—.

As used herein, the term "aryloxy" indicates "—O-aryl". An example of the aryloxy group is phenoxy. At least one hydrogen atom of the "aryloxy" group may be substituted with substituents that are the same as those described above with reference to the alkyl group.

As used herein, the term "heteroaryl group" indicates a monocyclic or bicyclic organic compound including at least one heteroatom selected from among nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring.

In the heteroaryl group, S or N may be present in various oxidized forms.

Non-limiting examples of the monocyclic heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, pyrazin-2-yl, pyrazin-4-yl, pyrazin-5-yl, pyrimidin-2-yl, pyrimidin-2-yl, and 5-pyrimidin-2-yl.

The term "heteroaryl" also indicates a heteroaromatic ring fused to at least one of an aryl group, a cycloaliphatic group, and a heterocyclic group.

Non-limiting examples of the bicyclic heteroaryl group are indolyl, isoindolyl, indazolyl, indolizinyl, purinyl, quinolizinyl, quinolinyl, isoquinolinyl, cinnolinyl, phthalazinyl, naphthyridinyl, quinazolinyl, quinoxalinyl, phenanthridinyl, phenanthrolinyl, phenazinyl, phenothiazinyl, phenoxazinyl, benzisoquinolinyl, thieno[2,3-b]furanyl, furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl.

At least one hydrogen atom of the heteroaryl group may be substituted with the same substituent as described above with reference to the alkyl group.

The term "heteroarylalkyl" group indicates an alkyl group substituted with a heteroaryl group.

The term "heteroaryloxy" group indicates a "—O-heteroaryl moiety". At least one hydrogen atom of the heteroaryloxy group may be substituted with substituents that are the same as those described above with reference to the alkyl group.

The term "heteroaryloxyalkyl" group indicates an alkyl group substituted with a heteroaryloxy group. At least one hydrogen atom of the heteroaryloxyalkyl group may be substituted with substituents that are the same as those described above with reference to the alkyl group.

As used herein, the term "carbocyclic" group indicates a saturated or partially unsaturated non-aromatic monocyclic, bicyclic or tricyclic hydrocarbon group.

Non-limiting examples of the monocyclic hydrocarbon group are cyclopentyl, cyclopentenyl, cyclohexyl, and cyclohexenyl.

Non-limiting examples of the bicyclic hydrocarbon group are bornyl, decahydronaphthyl, bicyclo[2.1.1]hexyl, bicyclo[2.2.1]heptyl, bicyclo[2.2.1]heptenyl, and bicyclo[2.2.2]octyl.

An example of the tricyclic hydrocarbon group is adamantyl.

At least one hydrogen atom of the "carbocyclic group" may be substituted with substituents that are the same as those described above with reference to the alkyl group.

The term "carbocyclic oxy group" indicates "—O-carbon ring."

The term "carbocyclic alkyl group" indicates "-alkylene-carbon ring."

The term "heterocyclic alkyl group" indicates "-alkylene-hetero ring."

As used herein, the term "carbocyclic alkyl" group indicates an alkyl group substituted with a carbocyclic group.

The term "heterocyclic" group in the formulae above refers to a five to ten-membered ring including a heteroatom such as N, S, P, or O. An example of the heterocyclic group is pyridyl. At least one hydrogen atom in the heterocyclic group may be substituted with the same substituent as described above with reference to the alkyl group.

The term "heterocyclic oxy" indicates "—O-hetero ring". At least one hydrogen atom of the heterocyclic oxy group may be substituted with substituents that are the same as those recited above with reference to the alkyl group.

As used herein, the term "heterocyclic alkyl" group indicates an alkyl group substituted with a heterocyclic group.

The term "sulfonyl" indicates R"—$SO_2$—, wherein R" is a hydrogen atom, alkyl, aryl, heteroaryl, aryl-alkyl, heteroaryl-alkyl, alkoxy, aryloxy, cycloalkyl, or a heterocyclic group.

The term "sulfamoyl" group refers to $H_2NS(O_2)$—, alkyl-$NHS(O_2)$—, (alkyl)$_2NS(O_2)$— aryl-$NHS(O_2)$—, alkyl-(aryl)-$NS(O_2)$—, (aryl)$_2NS(O)_2$, heteroaryl-$NHS(O_2)$—, (aryl-alkyl)-$NHS(O_2)$—, or (heteroaryl-alkyl)-$NHS(O_2)$—.

At least one hydrogen atom of the sulfamoyl group may be substituted with substituents that are the same as those described above with reference to the alkyl group.

The term "amino group" indicates a group with a nitrogen atom covalently bonded to at least one carbon or hetero atom. The amino group may refer to, for example, —$NH_2$ and —$NH_2$ substituted moieties.

The term "amino group" also refers to an "alkylamino group" with nitrogen bound to at least one additional alkyl group, and "arylamino" and "diarylamino" groups with at least one or two nitrogen atoms bound to a selected aryl group.

The terms "alkylene", "alkenylene", "alkynylene", "arylene", and "heteroarylene" are respectively defined to be same as the monovalent "alkyl", "alkenyl", "alkynyl", "aryl" and "heteroaryl" described above, except that they are divalent groups.

At least one hydrogen atom of the respective "alkylene," "alkenylene," "alkynylene," "arylene," and "heteroarylene" groups may be substituted with substituents that are the same as those described above in with reference to the alkyl group.

Hereinafter, one or more embodiments of the present disclosure will be described in detail with reference to the following examples. These examples are not intended to limit the purpose and scope of the one or more embodiments of the present disclosure.

EXAMPLE 1

Preparation of Composite and Composite Membrane (Cardanol:PBI=10:90 by Weight)

1.35 g of a compound (m-PBI) represented by Formula 51 below, 0.15 g of a compound (cardanol) represented by Formula 2F, and 8.5 g of N,N-dimethylacetamide were mixed together and stirred until PBI was completely dissolved. A predetermined amount of the stirred solution was cast on a glass plate to a thickness of about 40 μm, and placed in an oven. The oven temperature was slowly raised from about 25° C. to about 250° C. to dry and cure the cast film.

The oven temperature was slowly lowered to room temperature, and the film was separated from the surface of the glass plate, thereby forming a composite membrane that included a composite as a polymerization product of cardanol and PBI.

Formula 2F

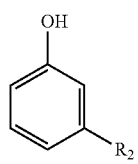

In Formula 2F, $R_2$ was as follows:

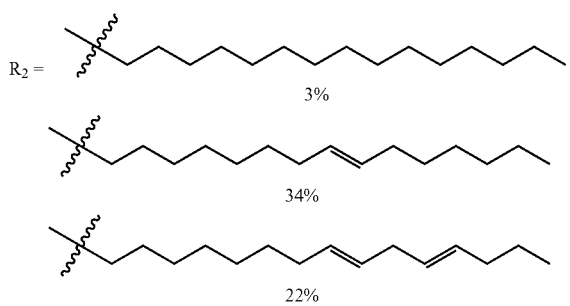

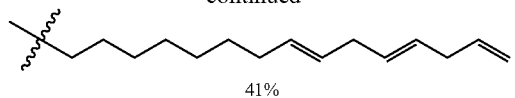

In Formula 2F, % in the representation of $R_2$ above indicates percent by weight (wt %).

Formula 51

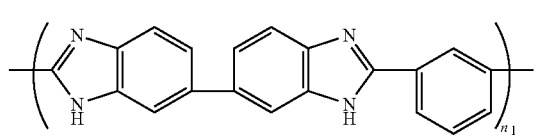

In Formula 51, $n_1$ was 30.

The composite membrane was sufficiently immersed in a 85 wt % $H_3PO_4$ solution at about 80° C. and was drawn out of the solution, thereby forming a phosphoric acid-doped composite membrane.

EXAMPLE 2

Preparation of Composite and Composite Membrane (Cardanol:PBI=20:80 by Weight)

A composite, a composite membrane, a phosphoric acid-doped composite membrane were formed in the same manner as in Example 1, except that 1.2 g of the compound (m-PBI) represented by Formula 51 above, and 0.3 g of the compound (cardanol) represented by Formula 2F were used.

EXAMPLE 3

Preparation of Composite and Composite Membrane (Cardanol:PBI=23:77 by Weight)

A composite, a composite membrane, a phosphoric acid-doped composite membrane were formed in the same manner as in Example 1, except that 1.155 g of the compound (m-PBI) represented by Formula 51 above, and 0.345 g of the compound (cardanol) represented by Formula 2F were used.

EXAMPLE 4

Preparation of Composite and Composite Membrane (Cardanol:PBI=33:67 by Weight)

A composite, a composite membrane, a phosphoric acid-doped composite membrane were formed in the same manner as in Example 1, except that 1.005 g of the compound (m-PBI) represented by Formula 51 above, and 0.495 g of the compound (cardanol) represented by Formula 2F were used.

EXAMPLE 5

Preparation of Composite and Composite Membrane (Cardanol:PBI=41:59 by Weight)

A composite, a composite membrane, a phosphoric acid-doped composite membrane were formed in the same manner as in Example 1, except that 0.885 g of the compound (m-PBI) represented by Formula 51 above, and 0.615 g of the compound (cardanol) represented by Formula 2F were used.

EXAMPLE 6

Preparation of Composite and Composite Membrane (Cardanol:PBI:tPPOa=42:42:16 by Weight)

A composite, a composite membrane including the composite, and a phosphoric acid-doped electrolyte membrane were formed in the same manner as in Example 1, except that 1.85 g of a compound represented by Formula 158 below was further added to 1.85 g of the compound (m-PBI) represented by Formula 51 above, and 0.74 g of the compound (cardanol) represented by Formula 2F above.

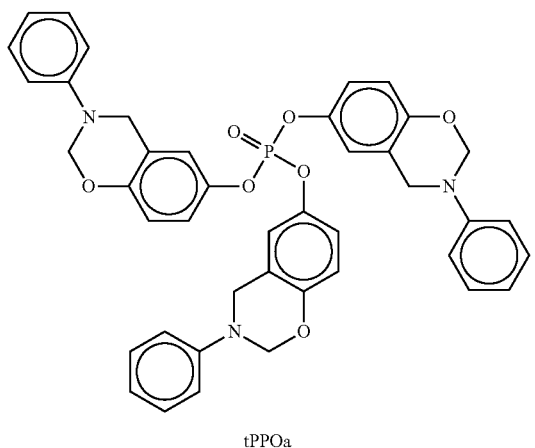

Formula 158 tPPOa

EXAMPLE 7

Preparation of Composite and Composite Membrane

A composite, a composite membrane, and a phosphoric acid-doped composite membrane were formed in the same manner as in Example 1, except that, instead of the compound (cardanol) of Formula 2F, urushiol was used.

EXAMPLES 8-12

Preparation of Composite and Composite Membrane

A composite, a composite membrane, and a phosphoric acid-doped composite membrane were formed in the same manner as in each of Examples 2-6, except that, instead of the compound (cardanol) of Formula 2F, urushiol was used.

COMPARATIVE EXAMPLE 1

Manufacture of PBI Membrane 1.5 g of a compound (m-PBI) represented by Formula 51 below, and 8.5 g of DMAc were mixed together and stirred until PBI was completely dissolved. A predetermined amount of the stirred solution was cast on a glass plate to a thickness of about 40 μm, and placed in an oven. The oven temperature was slowly raised from about 25° C. to about 250° C. to dry and cure the cast film.

The oven temperature was slowly lowered to room temperature, and the film was separated from the surface of the glass plate, thereby forming a PBI membrane.

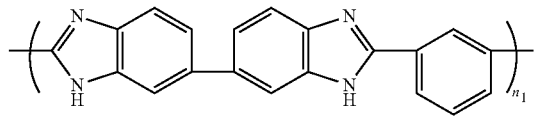

Formula 51

In Formula 51, $n_1$ was 30.

The PBI membrane was sufficiently immersed in a 85 wt % of $H_3PO_4$ solution at about 80° C. and was drawn out of the solution, thereby forming a phosphoric acid-doped PBI membrane.

EVALUATION EXAMPLE 1

Spectroscopic Data of Composite

Figure 3A:
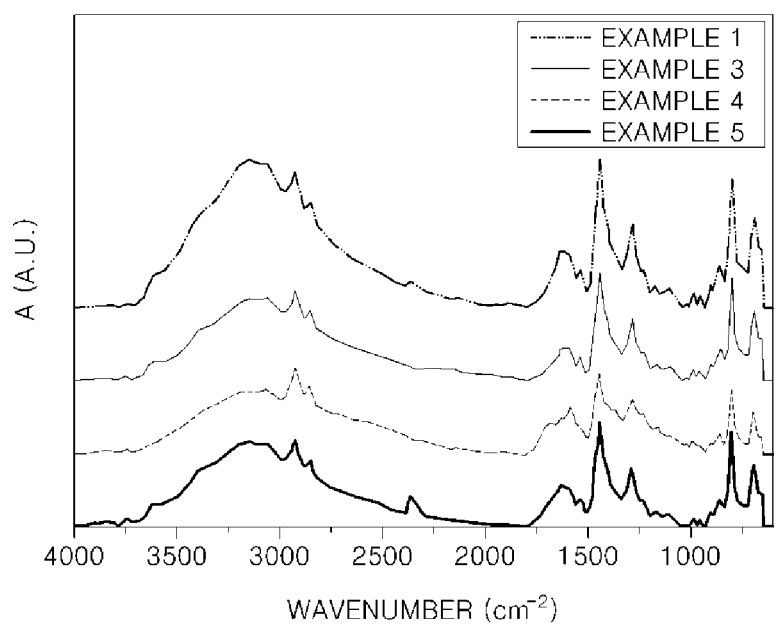
FIG. 3A is a graph of absorbance (arbitrary units, a.u.) versus wavenumber (reverse square centimeters, $cm^{-2}$), which presents infrared ("IR") absorption spectra of composites of Examples 1, 3, 4, and 5.

Infrared (IR) spectra of the composite of Examples 1, 3, 4, and 5 were measured. The results are shown in FIG. 3A.

EVALUATION EXAMPLE 2

Mechanical Strength Analysis of Composite Membrane

After removal of phosphoric acid from the surfaces of the phosphoric acid-doped composite membranes of Examples 1-6 and Comparative Example 1, the resultant membranes were weighed. The phosphoric acid doping level of each membrane was estimated according to Equation 1 below. The results are shown in Table 1 below.

$$H_3PO_4 \text{ doping level}(\%) = (W - W_P)/W_P \times 100 \qquad \text{Equation 1}$$

In Equation 1, W and $W_P$ indicate the weights of the composite membrane after and before doping with the phosphoric acid, respectively.

TABLE 1

| Example | Phosphoric acid doping level (%) |
|---|---|
| Comparative Example 1 | 310 |
| Example 1 | 320 |
| Example 2 | 325 |
| Example 3 | 318 |
| Example 4 | 363 |
| Example 5 | 460 |
| Example 6 | 457 |

Tensile strengths and elongations of the composite membranes of Examples 1-6 and Comparative Example 1 were measured using a universal testing machine (UTM, Lloyd LR-10K). Samples for the measurement were prepared according to ASTM standard D638 (Type V specimens).

Figure 3B:
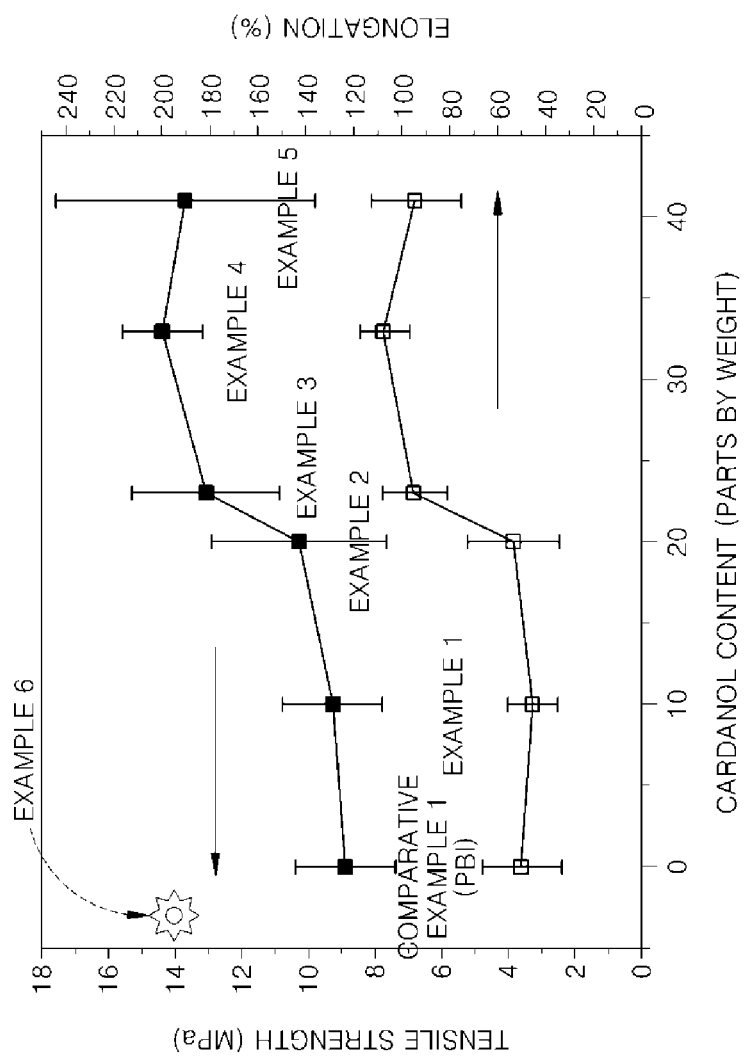
FIG. 3B is a graph of tensile strength (megaPascal, MPa) and elongation versus cardanol content (parts by weight) in composite membranes of Examples 1-6 and Comparative Example 1 after being doped with phosphoric acid.

The results of the tensile strength and elongation measurement are shown in FIG. 3B.

FIG. 3B is a graph of tensile strength and elongation with respect to amount of cardanol in electrolyte membranes of Examples 1-6 and Comparative Example 1 after being doped with phosphoric acid.

In general, the higher the phosphoric acid doping level, the mechanical strength of the PBI electrolyte membrane may be rapidly reduced. Referring to FIG. 3B, even with higher phosphoric acid doping levels after phosphoric acid doping as compared with the PBI membrane of Comparative Example 1, the composite membranes of Examples 1-6 have improved tensile strengths and elongations as compared with the PBI membrane of Comparative Example 1.

EVALUATION EXAMPLE 3

Conductivity Evaluation of Composite Membrane

Changes in conductivity with respect to temperature were measured on the composite membranes of Examples 1 and 2. The results are shown in FIG. 4.

The conductivities were measured according to a 4-point Probe-In Plane method in non-humidified, hydrogen ($H_2$) (flow rate: about 10 SCCM) conditions using a Bekktec equipment.

Figure 4:
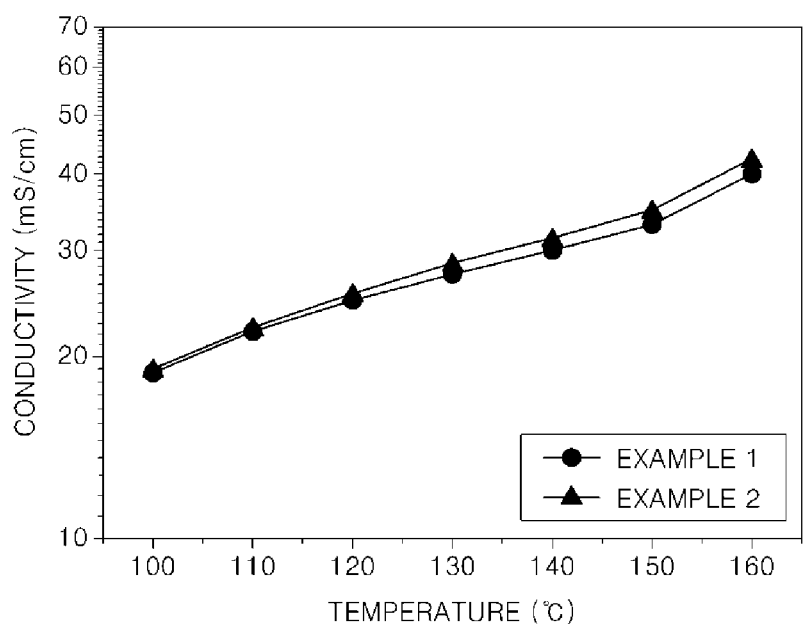
FIG. 4 is a graph of conductivity (milliSiemens per centimeter, mS/cm) versus temperature (degrees Celsius, ° C.) in the composite membranes of Examples 1 and 2, wherein the conductivity was measured according to Evaluation Example 3.

Referring to FIG. 4, the composite membranes of Examples 1 and 2 are found to have high conductivities.

EVALUATION EXAMPLE 4

Evaluation of Fuel Cell Performance

Fuel cells were manufactured by disposing either the composite membrane of Example 2 or the PBI membrane of Comparative Example 1 as an electrolyte membrane between a cathode and anode.

The cathode and anode were manufactured as follows for use in each cell.

4.5 g of a 10 wt % NAFION (available from Du Pont Inc.) aqueous dispersion was dropwise added to a mixture of 50 wt % of PtCo supported on carbon ("PtCo/C") in 3 ml of isopropyl alcohol, followed by mechanical agitation to prepare a composition for forming a cathode catalyst layer.

The composition for forming a cathode catalyst layer was coated on one surface of carbon paper to manufacture the cathode.

The anode was manufactured in the same manner as in the manufacture of the cathode, except that, instead of PtCo/C in the composition for forming a cathode catalyst layer, PtRu/C (50 wt % of PtRu supported on carbon) was used.

To test the performance of each fuel cell, non-humidified $H_2$ and $O_2$ were supplied to the anode and cathode at about 50 cubic centimeters ("ccm") and about 100 ccm, respectively, and the fuel cell was operated at about 100° C. to about 200° C. in non-humidified conditions to measure changes in cell voltage with respect to current density. The results are shown in FIG. 5.

Figure 5:
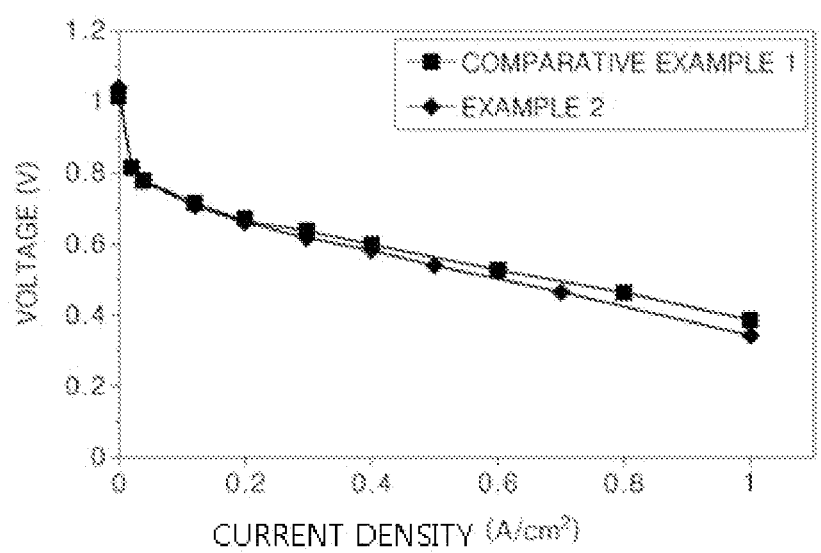
FIG. 5 is a graph of voltage (volts, V) versus current density (amperes per square centimeter, $A/cm^2$) representing results of a cell performance evaluation in Evaluation Example 4.

Referring to FIG. 5, the fuel cell with the electrolyte membrane of Example 2 was found to have satisfactory cell voltage characteristics, similar to the fuel cell including the PBI membrane of Comparative Example 1.

EVALUATION EXAMPLE 5

Evaluation of Cell Durability

Durabilities of the fuel cells manufactured according to Evaluation Example 4, which included either the electrolyte membrane of Example 2 or the PBI membrane of Comparative Example 1, were measured. The results are shown in FIGS. 6 and 7.

Figure 6:
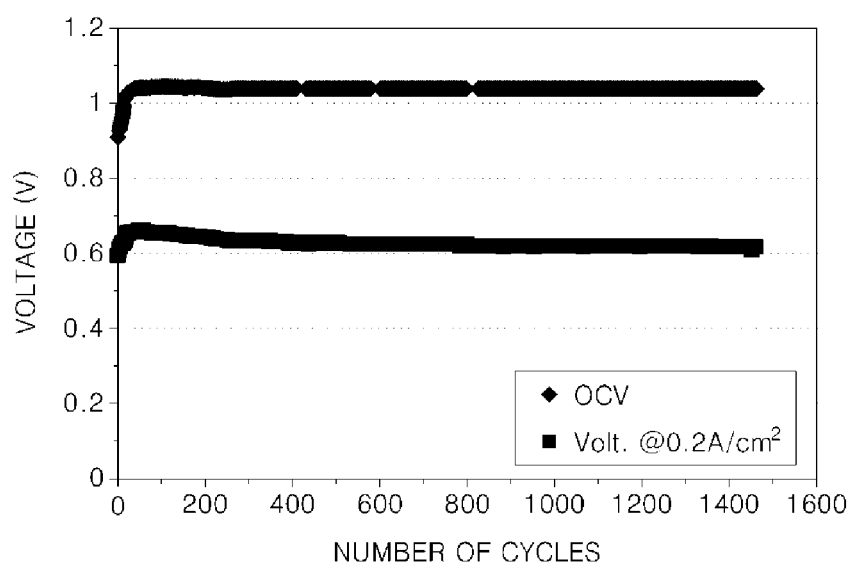
FIG. 6 is a graph of voltage (volts, V) versus number of cycles representing results of a durability evaluation of a fuel cell including the electrolyte membrane of Example 2 in Evaluation Example 4.

FIG. 6 is a graph representing results of the durability measurement using the fuel cell of Evaluation Example 4 with the electrolyte membrane of Example 2. FIG. 7 is a graph representing results of the durability measurement using the fuel cell of Evaluation Example 4 with the PBI membrane of Comparative Example 1.

Cell durability was measured as a change in open circuit voltage ("OCV") through repeated cycles of an accelerated lifetime test ("ALT") mode for about 1 hour per each cycle at a high current density of about 0 to 1 $Acm^{-2}$.

Figure 7:
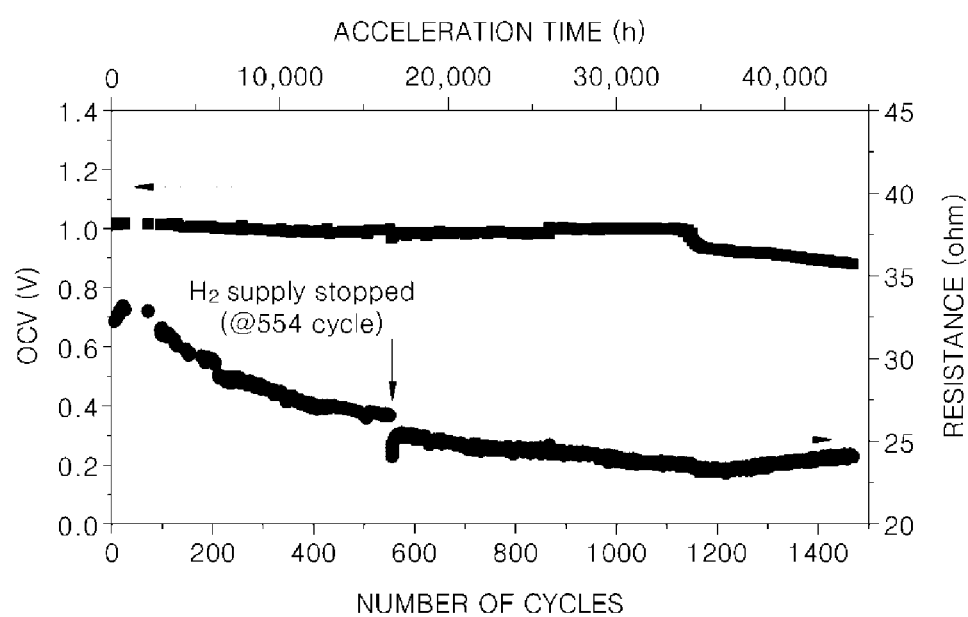
FIG. 7 is a graph representing results of a durability evaluation of a fuel cell including a polybenzimidazole ("PBI") membrane of Comparative Example 1 in Evaluation Example 4.

Referring to FIG. 6, the fuel cell including the electrolyte membrane of Example 2 is found to have stable cell voltage characteristics after about 1500 cycles, unlike the fuel cell including the PBI membrane of Comparative Example 1 as represented in FIG. 7, indicating that the fuel cell with the electrolyte membrane of Example 2 has improved long-term durability.

As described above, according to the one or more of the above embodiments of the present disclosure, a composite membrane with enhanced mechanical strength, and a highly efficient fuel cell with improved durability using the composite membrane may be manufactured.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A composition comprising at least one of compounds represented by Formula 1 and a cross-linkable compound:

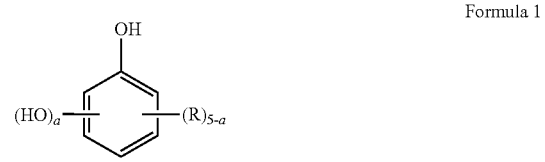

Formula 1 wherein, in Formula 1,
a is 0, 1, or 2; b is 0, 1, 2, 3, or 4, provided that a+b is 1, 2, 3, 4, or 5, and b−a is greater than or equal to 0; and
each R is independently a substituted or unsubstituted $C_1$-$C_{40}$ alkoxy group, a substituted or unsubstituted $C_2$-$C_{40}$ alkenyl group, a substituted or unsubstituted $C_2$-$C_{40}$ alkynyl group, a substituted or unsubstituted $C_6$-$C_{40}$ aryl group, a substituted or unsubstituted $C_6$-$C_{40}$ aryloxy group, a substituted or unsubstituted $C_2$-$C_{40}$ heteroaryl group, a substituted or unsubstituted $C_2$-$C_{40}$ heteroaryloxy group, a substituted or unsubstituted $C_4$-$C_{40}$ carbocyclic group, a substituted or unsubstituted $C_4$-$C_{40}$ carbocyclic oxy group, a substituted or unsubstituted $C_2$-$C_{40}$ heterocyclic group, a halogen atom, a hydroxyl group, or a cyano group; and
wherein the at least one of compounds represented by Formula 1 comprises at least one of compounds represented by Formula 2 or at least one of compounds represented by Formula 3:

Formula 2 wherein in Formula 2, R is a substituted or unsubstituted $C_{10}$-$C_{30}$ alkenyl group, or a substituted or unsubstituted $C_{10}$-$C_{30}$ alkynyl group;

Formula 3

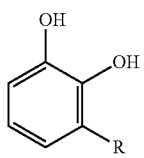

wherein, in Formula 3, R is a substituted or unsubstituted $C_{10}$-$C_{30}$ alkyl group, a substituted or unsubstituted $C_{10}$-$C_{30}$ alkenyl group, or a substituted or unsubstituted $C_{10}$-$C_{30}$ alkynyl group.

2. The composition of claim 1, wherein the at least one of compounds represented by Formula 1 comprises at least one of a compound represented by Formula 2B, a compound represented by Formula 2C, and a compound represented by Formula 2D:

Formula 2B

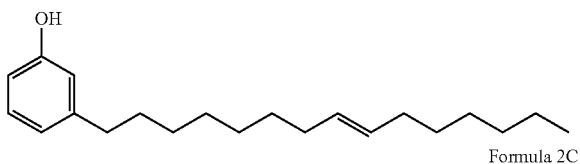

Formula 2C

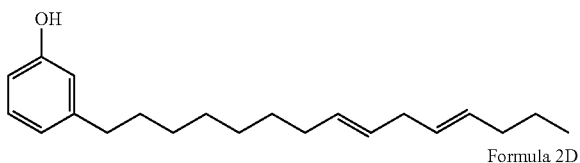

Formula 2D

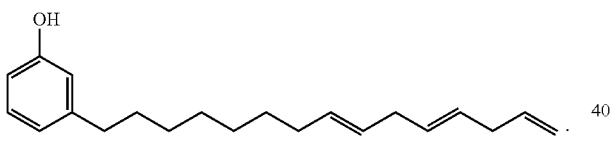

3. The composition of claim 2, comprising about 30-35 weight % of the compound of Formula 2B, about 20-25 weight % of the compound of Formula 2C, and about 40-45 weight % of the compound of Formula 2D.

4. The composition of claim 2, comprising about 34 weight % of the compound of Formula 2B, about 22 weight % of the compound of Formula 2C, and about 41 weight % of the compound of Formula 2D.

5. The composition of claim 1, wherein the at least one of compounds represented by Formula 1 comprises at least one of a compound represented by Formula 3A, a compound represented by Formula 3B, a compound represented by Formula 3C, a compound represented by Formula 3D, or a compound represented by Formula 3E:

Formula 3A

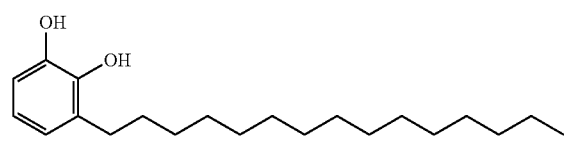

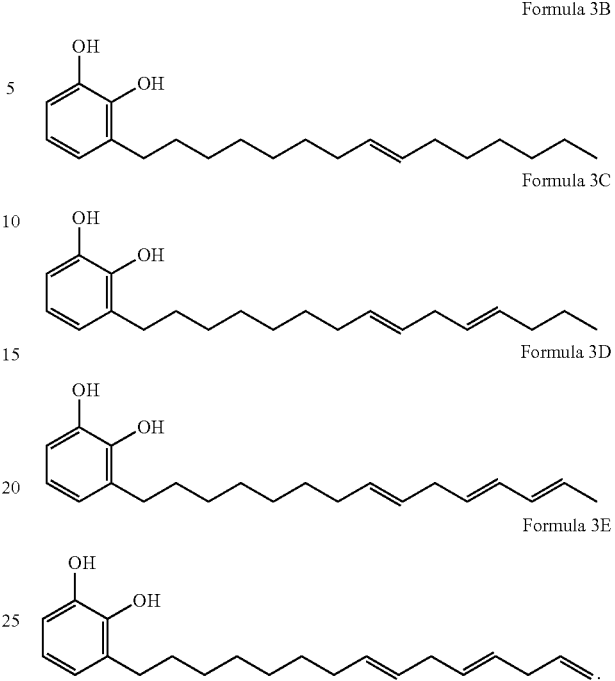

6. The composition of claim 1, wherein the composition further comprises at least one of compounds represented by Formulae 4-9:

Formula 4

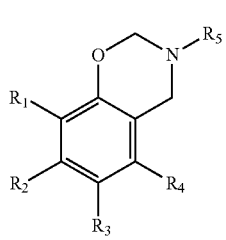

wherein, in Formula 4, $R_1$, $R_2$, $R_3$ and $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, a halogen atom, a hydroxy group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group;

Formula 5

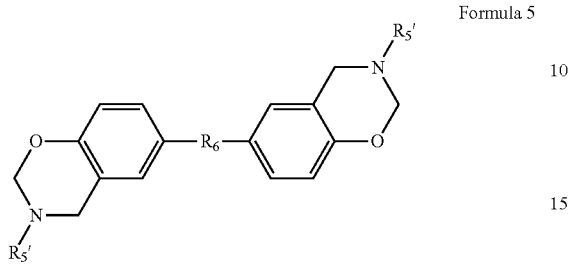

wherein, in Formula 5, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and $R_6$ is a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, or —SO$_2$—;

Formula 6 wherein, in Formula 6, A, B, C, D and E are all carbon; or one or two of A, B, C, D and E is nitrogen and the others are carbon; and $R_7$ and $R_8$ are linked to form a ring, wherein the ring is a $C_6$-$C_{10}$ cycloalkyl group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group;

Formula 7 wherein, in Formula 7, A' is a substituted or unsubstituted $C_1$-$C_{20}$ heterocyclic group, a substituted or unsubstituted $C_4$-$C_{20}$ cycloalkyl group, or a substituted or unsubstituted $C_1$-$C_{20}$ alkyl group; and $R_9$ to $R_{16}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_2$-$C_{20}$ heteroaryl group, a $C_2$-$C_{20}$ heteroaryloxy group, a $C_4$-$C_{20}$ cycloalkyl group, a $C_1$-$C_{20}$ heterocyclic group, a halogen atom, a cyano group, or a hydroxy group;

Formula 8 wherein, in Formula 8, $R_{17}$ and $R_{18}$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group, or a group represented by Formula 8A:

Formula 8A wherein, in Formulae 8 and 8A, $R_{19}$ and $R_{19}'$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_2$-$C_{20}$ heteroaryl group, a $C_2$-$C_{20}$ heteroaryloxy group, a halogenated $C_2$-$C_{20}$ heteroaryl group, a halogenated $C_2$-$C_{20}$ heteroaryloxy group, a $C_4$-$C_{20}$ cycloalkyl group, a halogenated $C_4$-$C_{20}$ cycloalkyl group, a $C_1$-$C_{20}$ heterocyclic group, or a halogenated $C_1$-$C_{20}$ heterocyclic group;

Formula 9 wherein, in Formula 9, two adjacent groups selected from $R_{20}$, $R_{21}$, and $R_{22}$ are linked to form a group represented by Formula 9A;

the unselected rest of $R_{20}$, $R_{21}$ and $R_{22}$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_2$-$C_{20}$ heteroaryl group, a $C_2$-$C_{20}$ heteroaryloxy group, a halogenated $C_2$-$C_{20}$ heteroaryl group, a halogenated $C_2$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group, or a halogenated $C_1$-$C_{20}$ heterocyclic group;

two adjacent groups selected from $R_{23}$, $R_{24}$, and $R_{25}$ are linked to form a group represented by Formula 9A; and the unselected rest of $R_{23}$, $R_{24}$ and $R_{25}$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_2$-$C_{20}$ heteroaryl group, a $C_2$-$C_{20}$ heteroaryloxy group, a halogenated $C_2$-$C_{20}$ heteroaryl group, a halogenated $C_2$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group, or a halogenated $C_1$-$C_{20}$ heterocyclic group;

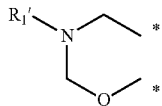

Formula 9A wherein, in Formula 9A, $R_1'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and

* denotes the sites at which the two adjacent groups selected from $R_{20}$, $R_{21}$ and $R_{22}$ of Formula 9 are linked and the two adjacent groups selected from $R_{23}$, $R_{24}$ and $R_{25}$ of Formula 9 are linked.

7. The composition of claim 1, wherein an amount of the at least one of compounds of Formula 1 is from about 5 parts to about 60 parts by weight based on 100 parts by weight of the cross-linkable compound.

8. The composition of claim 6, wherein an amount of the at least one of compounds of Formulae 4 to 9 is from about 5 parts to about 70 parts by weight based on 100 parts by weight of the cross-linkable compound.

9. The composition of claim 1, wherein the cross-linkable compound comprises at least one of a azole-based polymer, polyoxazole, polyimide, polysulfone, polyether sulfone, and polyketone.

10. The composition of claim 9, wherein the azole-based polymer comprises 2,5-polybenzimidazole, poly(2,2'-(m-phenylene)-5,5'-bibenzimidazole), or poly(2,2'-(p-phenylene)-5,5'-bibenzimidazole).

11. The composition of claim 1, further comprising a phosphoric acid-based material.

12. The composition of claim 11, wherein an amount of the phosphoric acid-based material is from about 1 part to about 500 parts by weight based on 100 parts by weight of the at least one of compounds of Formula 1.

13. A composite that is a polymerization product of the composition according to claim 1.

14. A composite membrane comprising the composite of claim 13.

15. An electrode for a fuel cell, the electrode comprising the composition according to claim 1, or the composite according to claim 13.

16. A fuel cell comprising:
a cathode;
an anode; and
an electrolyte membrane disposed between the cathode and the anode,
wherein the electrolyte membrane comprises the composite membrane of claim 14.

17. A fuel cell comprising:
a cathode;
an anode; and
an electrolyte membrane disposed between the cathode and the anode,
wherein at least one of the cathode and the anode comprises the composition according to claim 1, or the composite according to claim 13.

18. A composition comprising about 1-5 weight % of the compound of Formula 2A about 30-35 weight % of the compound of Formula 2B about 20-25 weight % of the compound of Formula 2C, and about 40-45 weight % of the compound of Formula 2D and a cross-linkable compound:

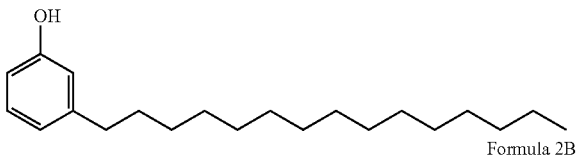

Formula 2A

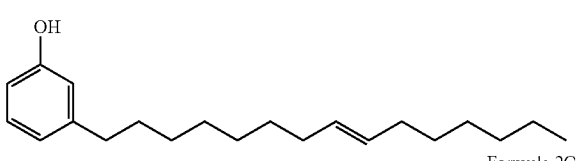

Formula 2B

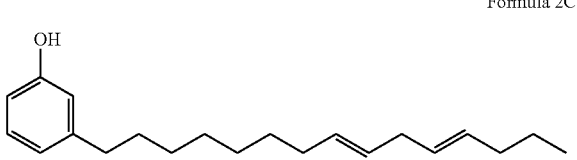

Formula 2C

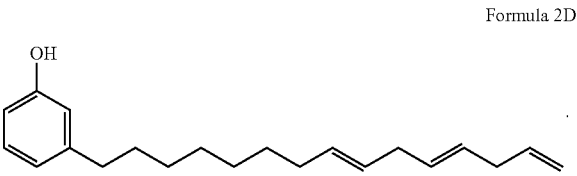

Formula 2D

19. The composition of claim 18, wherein the composition further comprises at least one of compounds represented by Formulae 4-9:

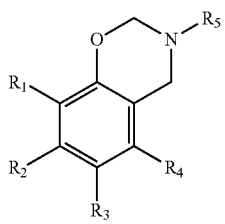

Formula 4 wherein, in Formula 4, $R_1$, $R_2$, $R_3$ and $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, a halogen atom, a hydroxy group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group;

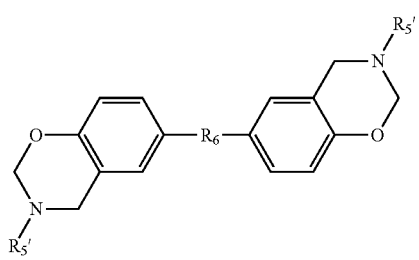

Formula 5 wherein, in Formula 5, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and $R_6$ is a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, or —SO$_2$—;

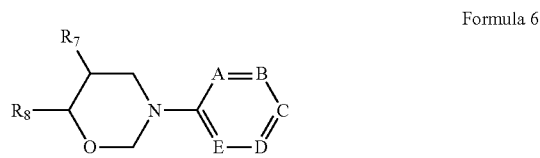

Formula 6 wherein, in Formula 6, A, B, C, D and E are all carbon; or one or two of A, B, C, D and E is nitrogen and the others are carbon; and $R_7$ and $R_8$ are linked to form a ring, wherein the ring is a $C_6$-$C_{10}$ cycloalkyl group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group;

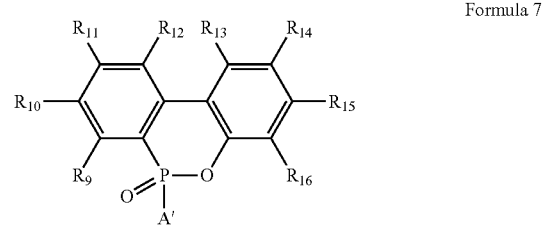

Formula 7 wherein, in Formula 7, A' is a substituted or unsubstituted $C_1$-$C_{20}$ heterocyclic group, a substituted or unsubstituted $C_4$-$C_{20}$ cycloalkyl group, or a substituted or unsubstituted $C_1$-$C_{20}$ alkyl group; and $R_9$ to $R_{16}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_2$-$C_{20}$ heteroaryl group, a $C_2$-$C_{20}$ heteroaryloxy group, a $C_4$-$C_{20}$ cycloalkyl group, a $C_1$-$C_{20}$ heterocyclic group, a halogen atom, a cyano group, or a hydroxy group;

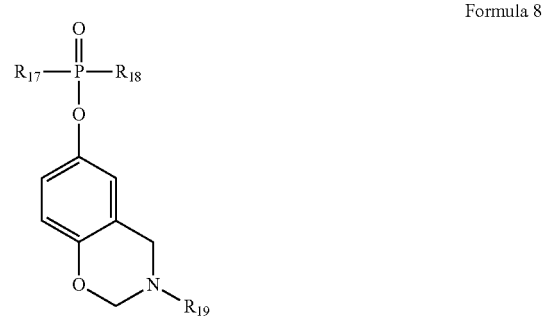

Formula 8 wherein, in Formula 8, $R_{17}$ and $R_{18}$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group, or a group represented by Formula 8A:

Formula 8A

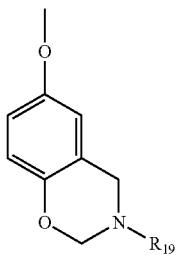

wherein, in Formulae 8 and 8A, $R_{19}$ and $R_{19'}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_2$-$C_{20}$ heteroaryl group, a $C_2$-$C_{20}$ heteroaryloxy group, a halogenated $C_2$-$C_{20}$ heteroaryl group, a halogenated $C_2$-$C_{20}$ heteroaryloxy group, a $C_4$-$C_{20}$ cycloalkyl group, a halogenated $C_4$-$C_{20}$ cycloalkyl group, a $C_1$-$C_{20}$ heterocyclic group, or a halogenated $C_1$-$C_{20}$ heterocyclic group;

Formula 9

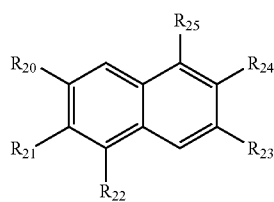

wherein, in Formula 9, two adjacent groups selected from $R_{20}$, $R_{21}$, and $R_{22}$ are linked to form a group represented by Formula 9A;

the unselected rest of $R_{20}$, $R_{21}$ and $R_{22}$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_2$-$C_{20}$ heteroaryl group, a $C_2$-$C_{20}$ heteroaryloxy group, a halogenated $C_2$-$C_{20}$ heteroaryl group, a halogenated $C_2$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group, or a halogenated $C_1$-$C_{20}$ heterocyclic group;

two adjacent groups selected from $R_{23}$, $R_{24}$, and $R_{25}$ are linked to form a group represented by Formula 9A; and the unselected rest of $R_{23}$, $R_{24}$ and $R_{25}$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_2$-$C_{20}$ heteroaryl group, a $C_2$-$C_{20}$ heteroaryloxy group, a halogenated $C_2$-$C_{20}$ heteroaryl group, a halogenated $C_2$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group, or a halogenated $C_1$-$C_{20}$ heterocyclic group;

Formula 9A

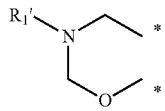

wherein, in Formula 9A, $R_1'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkenyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and

* denotes the sites at which the two adjacent groups selected from $R_{20}$, $R_{21}$ and $R_{22}$ of Formula 9 are linked and the two adjacent groups selected from $R_{23}$, $R_{24}$ and $R_{25}$ of Formula 9 are linked.

20. The composition of claim 18, wherein a total amount of the compound of Formula 2A, the compound of Formula 2B, the compound of Formula 2C, and the compound of Formula 2D is from about 5 parts to about 60 parts by weight based on 100 parts by weight of the cross-linkable compound.

21. The composition of claim 19, wherein an amount of the at least one of compounds of Formulae 4 to 9 is from about 5 parts to about 70 parts by weight based on 100 parts by weight of the cross-linkable compound.

22. The composition of claim 18, wherein the cross-linkable compound comprises at least one of a azole-based polymer, polyoxazole, polyimide, polysulfone, polyether sulfone, and polyketone.

23. The composition of claim 22, wherein the azole-based polymer comprises 2,5-polybenzimidazole, poly(2,2'-(m-phenylene)-5,5'-bibenzimidazole), or poly(2,2'-(p-phenylene)-5,5'-bibenzimidazole).

24. The composition of claim 18, further comprising a phosphoric acid-based material.

25. A composite that is a polymerization product of the composition according to claim 18.

26. A composite membrane comprising the composite of claim 25.

27. An electrode for a fuel cell, the electrode comprising the composition according to claim 22, or the composite according to claim 25.

28. A fuel cell comprising:
a cathode;
an anode; and
an electrolyte membrane disposed between the cathode and the anode,
wherein the electrolyte membrane comprises the composite membrane of claim 25.

* * * * *